(12) United States Patent
Ben Meir

(10) Patent No.: US 11,981,109 B2
(45) Date of Patent: May 14, 2024

(54) HYBRID STRUCTURE HAVING SUSPENSION QUALITY

(71) Applicant: TETRO LTD., Quarry Bay (HK)

(72) Inventor: Ilan Ben Meir, Ra'anana (IL)

(73) Assignee: TETRO LTD., Quarry Bay (HK)

( * ) Notice: Subject to any disclaimer, the term of this patent is extended or adjusted under 35 U.S.C. 154(b) by 87 days.

(21) Appl. No.: 17/451,224

(22) Filed: Oct. 18, 2021

(65) Prior Publication Data

US 2022/0118745 A1 Apr. 21, 2022

(30) Foreign Application Priority Data

Oct. 19, 2020 (IL) .......................................... 278158
Apr. 27, 2021 (IL) .......................................... 282720

(51) Int. Cl.
*B32B 3/26* (2006.01)
*B32B 3/06* (2006.01)
(Continued)

(52) U.S. Cl.
CPC .............. *B32B 27/065* (2013.01); *B32B 3/06* (2013.01); *B32B 3/26* (2013.01); *B32B 3/30* (2013.01); *B32B 5/18* (2013.01); *B32B 7/02* (2013.01); *B32B 7/022* (2019.01); *B32B 7/08* (2013.01); *B32B 3/10* (2013.01); *B32B 27/32* (2013.01); *B32B 2264/0257* (2013.01); *B32B 2266/025* (2013.01); *B32B 2305/02* (2013.01); *B32B 2307/50* (2013.01); *B32B 2307/51* (2013.01); *B32B 2307/536* (2013.01); *B32B 2307/546* (2013.01); *B32B 2307/56* (2013.01); *B32B 2307/72* (2013.01); *B32B 2323/10* (2013.01); *B60N 2/70* (2013.01); *B62J 1/00* (2013.01); *B62J 1/007* (2013.01); *B62J 1/18* (2013.01); *B62J 1/26* (2013.01);
(Continued)

(58) Field of Classification Search
None
See application file for complete search history.

(56) References Cited

U.S. PATENT DOCUMENTS 566,344 A * 8/1896 Sager .......................... B62J 1/26
297/202
595,599 A * 12/1897 Lamplugh .................. B62J 1/26
297/200
(Continued)

FOREIGN PATENT DOCUMENTS

CN 107826168 A 3/2018
CN 107826186 A 3/2018
(Continued)

OTHER PUBLICATIONS

International Search Report for International Application No. PCT/IL2021051225 dated Dec. 27, 2021.

*Primary Examiner* — Jeffrey A Vonch
(74) *Attorney, Agent, or Firm* — Dorsey & Whitney LLP

(57) ABSTRACT

In an embodiment, a hybrid structure having suspension quality, comprises a core member having an outer surface, a reducible-volume layer associated with the outer surface of the core member and having a reducible volume at least at a number of regions thereof, and a covering layer having an exterior and an interior surface and connected to the core member via the reducible-volume layer by a connection arrangement.

34 Claims, 18 Drawing Sheets

(51) Int. Cl.
  *B32B 3/30* (2006.01)
  *B32B 5/18* (2006.01)
  *B32B 7/02* (2019.01)
  *B32B 7/022* (2019.01)
  *B32B 7/08* (2019.01)
  *B32B 27/06* (2006.01)
  *B32B 27/32* (2006.01)
  *B32B 3/10* (2006.01)
  *B60N 2/70* (2006.01)
  *B62J 1/00* (2006.01)
  *B62J 1/18* (2006.01)
  *B62J 1/26* (2006.01)

(52) U.S. Cl.
  CPC .......... *Y10T 428/24025* (2015.01); *Y10T 428/24182* (2015.01); *Y10T 428/24562* (2015.01); *Y10T 428/24612* (2015.01); *Y10T 428/24942* (2015.01); *Y10T 428/2495* (2015.01); *Y10T 428/24983* (2015.01); *Y10T 428/24992* (2015.01); *Y10T 428/249987* (2015.04); *Y10T 428/249988* (2015.04); *Y10T 428/249993* (2015.04)

(56) References Cited

U.S. PATENT DOCUMENTS

| | | | | |
|---|---|---|---|---|
| 823,915 | A * | 6/1906 | Brooks | B62J 1/00 297/212 |
| 1,296,359 | A * | 3/1919 | Brown | A63D 5/00 182/138 |
| 1,585,405 | A * | 5/1926 | Mesinger | B62J 1/08 297/214 |
| 1,981,300 | A * | 11/1934 | Berg | A43B 7/06 36/28 |
| 1,982,516 | A * | 11/1934 | Holmested | B60N 2/707 297/452.45 |
| 2,300,379 | A * | 10/1942 | Faulhaber | B62J 1/26 297/214 |
| 2,314,046 | A * | 3/1943 | Kalter | B62J 1/26 297/214 |
| 2,465,725 | A * | 3/1949 | Herzmark | A61H 7/00 482/79 |
| 2,810,671 | A * | 10/1957 | Taylor | B60N 3/044 428/101 |
| 3,041,221 | A * | 6/1962 | Judson | A47G 27/0212 297/DIG. 3 |
| 3,416,838 | A * | 12/1968 | Mesinger | B62J 1/08 297/215.14 |
| 3,434,715 | A * | 3/1969 | Brantingham | A63B 21/4037 482/79 |
| 3,514,156 | A * | 5/1970 | Fields | B62J 1/00 297/452.45 |
| 3,722,955 | A * | 3/1973 | Trotman | B60N 2/5866 297/452.45 |
| 3,950,908 | A * | 4/1976 | Van Eyk | E01C 13/045 52/436 |
| 4,307,471 | A * | 12/1981 | Lovell | A42B 3/12 2/425 |
| 4,451,083 | A * | 5/1984 | Marchello | B62J 1/20 297/214 |
| 4,472,472 | A * | 9/1984 | Schultz | B32B 27/08 2/412 |
| 4,509,510 | A * | 4/1985 | Hook | A61H 7/001 601/28 |
| 4,614,000 | A * | 9/1986 | Mayer | A61F 13/00 5/724 |
| 4,674,203 | A * | 6/1987 | Goller | A43B 17/00 36/141 |
| 4,756,937 | A * | 7/1988 | Mentzer | B32B 5/245 428/36.1 |
| 4,957,788 | A * | 9/1990 | Colonel | E01C 13/08 428/167 |
| 4,999,068 | A * | 3/1991 | Chiarella | B62J 1/18 297/DIG. 2 |
| 5,030,501 | A | 7/1991 | Colvin et al. | |
| 5,102,703 | A * | 4/1992 | Colonel | F16B 5/07 428/167 |
| 5,180,619 | A * | 1/1993 | Landi | B29C 66/112 428/116 |
| 5,203,607 | A * | 4/1993 | Landi | B62J 1/26 428/116 |
| 5,252,373 | A * | 10/1993 | Ganske | B32B 27/285 297/214 |
| 5,325,552 | A * | 7/1994 | Fong | A47C 21/046 5/724 |
| 5,333,930 | A * | 8/1994 | Glenn | B60N 2/6036 297/219.11 |
| 5,348,369 | A * | 9/1994 | Yu | B62J 1/00 297/214 |
| 5,356,205 | A * | 10/1994 | Calvert | B62J 1/002 297/214 |
| 5,411,318 | A * | 5/1995 | Law | A47C 7/74 297/452.45 |
| 5,628,079 | A * | 5/1997 | Kizemchuk | A61H 7/001 601/134 |
| 5,738,406 | A * | 4/1998 | Deus | B62J 1/00 297/452.41 |
| 5,904,396 | A * | 5/1999 | Yates | B62J 1/26 297/214 |
| 5,915,819 | A * | 6/1999 | Gooding | A43B 19/00 36/71 |
| 5,927,802 | A * | 7/1999 | Kesinger | B62J 1/00 297/202 |
| 6,039,396 | A * | 3/2000 | Muser | B62J 1/26 297/214 |
| 6,254,180 | B1 | 7/2001 | Nelson | |
| 6,687,934 | B1 * | 2/2004 | Liao | A47C 7/14 297/195.1 |
| 6,860,551 | B1 * | 3/2005 | Chi | B62J 1/26 297/214 |
| 6,860,552 | B1 | 3/2005 | Bigolin | |
| 6,957,857 | B1 * | 10/2005 | Lee | B62J 1/00 297/195.1 |
| 7,416,250 | B1 * | 8/2008 | DiFilippo | B62J 1/20 297/228.11 |
| 7,695,069 | B2 * | 4/2010 | Prust | A47C 7/74 297/452.45 |
| 2001/0008678 | A1 * | 7/2001 | Hoffman | A43B 13/187 428/138 |
| 2002/0003364 | A1 * | 1/2002 | Minkow | B62J 1/007 297/202 |
| 2003/0042770 | A1 * | 3/2003 | Yu | B62J 1/00 297/215.16 |
| 2003/0164629 | A1 * | 9/2003 | Bigolin | B62J 1/00 297/214 |
| 2003/0233718 | A1 | 12/2003 | Heathcock et al. | |
| 2004/0098806 | A1 * | 5/2004 | Stender | A47C 7/021 5/655.9 |
| 2004/0131423 | A1 * | 7/2004 | Ianniello | E01C 3/00 405/36 |
| 2005/0104423 | A1 | 5/2005 | Yu | |
| 2005/0121951 | A1 * | 6/2005 | Yu | B62J 1/00 297/195.1 |
| 2005/0279591 | A1 * | 12/2005 | Coffield | A47C 7/14 188/131 |
| 2006/0001291 | A1 * | 1/2006 | Dooley | B60R 13/0206 296/153 |
| 2006/0119148 | A1 * | 6/2006 | Bigolin | B62J 1/00 297/214 |
| 2006/0177635 | A1 | 8/2006 | Pepe et al. | |
| 2007/0246978 | A1 * | 10/2007 | Yu | B62J 1/00 297/214 |
| 2007/0262634 | A1 * | 11/2007 | Brill | A47C 23/002 297/452.15 |
| 2007/0290534 | A1 * | 12/2007 | Rutherford | B62J 1/00 297/195.1 |
| 2008/0016622 | A1 * | 1/2008 | Prust | A47C 7/021 5/653 |

(56) References Cited

U.S. PATENT DOCUMENTS

| | | | |
|---|---|---|---|
| 2008/0197680 A1* | 8/2008 | Chuang | B62J 1/007 297/214 |
| 2008/0217968 A1* | 9/2008 | Segato | B62J 1/02 297/215 |
| 2008/0277979 A1* | 11/2008 | Segato | B62J 1/00 297/215.15 |
| 2009/0061146 A1* | 3/2009 | Segato | A43B 13/04 428/68 |
| 2009/0189421 A1* | 7/2009 | Yu | B62J 1/00 297/195.1 |
| 2010/0013278 A1* | 1/2010 | Segato | B62J 1/00 297/215.16 |
| 2010/0026076 A1* | 2/2010 | Partington | B62K 5/01 297/452.56 |
| 2010/0047550 A1* | 2/2010 | Prissok | C08G 18/3206 428/313.5 |
| 2010/0225148 A1* | 9/2010 | Segato | B62J 1/00 264/250 |
| 2012/0079661 A1* | 4/2012 | Chen | B68G 5/00 5/652 |
| 2012/0242119 A1* | 9/2012 | Bigolin | B62J 1/24 297/195.1 |
| 2012/0322331 A1* | 12/2012 | Worthington | B32B 5/028 442/381 |
| 2013/0205509 A1* | 8/2013 | Chen | A47C 27/146 5/737 |
| 2013/0207423 A1 | 8/2013 | Russell et al. | |
| 2013/0234376 A1* | 9/2013 | Frey | A41D 13/015 267/141 |
| 2014/0054937 A1 | 2/2014 | Sam et al. | |
| 2014/0070576 A1* | 3/2014 | Wu | B62J 1/00 297/214 |
| 2014/0110980 A1* | 4/2014 | Attey | B62J 1/02 297/195.1 |
| 2014/0182049 A1* | 7/2014 | Prust | A42B 3/12 36/43 |
| 2014/0259322 A1* | 9/2014 | Henry | A63B 71/1225 2/455 |
| 2015/0175229 A1* | 6/2015 | Chiba | B60N 2/686 297/452.18 |
| 2015/0183476 A1* | 7/2015 | Chiba | B62J 1/18 297/214 |
| 2015/0210333 A1* | 7/2015 | Marui | B62J 1/02 297/215.16 |
| 2015/0290904 A1* | 10/2015 | Miyashita | B32B 3/30 428/134 |
| 2016/0368553 A1* | 12/2016 | Bigolin | B32B 25/10 |
| 2017/0021779 A1* | 1/2017 | Yoshida | B32B 3/30 |
| 2017/0036724 A1 | 2/2017 | Yu | |
| 2017/0240235 A1* | 8/2017 | Wu | B62J 1/26 |
| 2017/0313373 A1* | 11/2017 | Bigolin | B62J 1/22 |
| 2018/0084914 A1* | 3/2018 | Deevers | A47C 7/027 |
| 2018/0200926 A1* | 7/2018 | Yu | B29C 44/1219 |
| 2019/0061850 A1* | 2/2019 | Sung | B62J 1/002 |
| 2019/0061853 A1* | 2/2019 | Krause | B62J 1/02 |
| 2019/0202513 A1* | 7/2019 | Arnold | B62J 1/26 |
| 2019/0291802 A1 | 9/2019 | Sung | |
| 2020/0010135 A1* | 1/2020 | Arnold | B62J 1/26 |
| 2020/0121026 A1* | 4/2020 | Shen | A43B 17/08 |
| 2020/0255080 A1* | 8/2020 | Krause | B62J 1/26 |
| 2021/0023747 A1* | 1/2021 | Bigolin | B29C 33/565 |
| 2021/0046729 A1* | 2/2021 | Prissok | B32B 5/02 |
| 2021/0129931 A1* | 5/2021 | Bigolin | B62J 1/08 |
| 2023/0145157 A1* | 5/2023 | Scholz | B32B 3/06 428/17 |

FOREIGN PATENT DOCUMENTS

| | | | | |
|---|---|---|---|---|
| CN | 108908848 A | * | 11/2018 | |
| CN | 213082974 U | | 4/2021 | |
| DE | 4135364 A1 | * | 4/1993 | A47C 7/74 |
| DE | 19640263 A1 | * | 4/1998 | A43B 17/14 |
| DE | 102008051978 A1 | * | 4/2010 | B60N 2/46 |
| DE | 202016105726 U1 | * | 2/2018 | |
| DE | 202017000484 U1 | * | 6/2018 | B62J 1/08 |
| DE | 202017002940 U1 | * | 10/2018 | B62J 1/00 |
| DE | 102018211090 A1 | * | 1/2020 | |
| DK | 9300348 A | * | 9/1994 | |
| EP | 3441291 A1 | * | 2/2019 | |
| FR | 2558701 A | * | 8/1985 | A47C 7/022 |
| JP | 08057172 A | * | 3/1996 | |
| JP | 08253180 A | * | 10/1996 | B62J 1/00 |
| JP | 2001171574 A | * | 6/2001 | |
| JP | 2007186075 A | * | 7/2007 | |
| WO | WO-8101234 A | * | 5/1981 | A43B 13/184 |
| WO | WO-2013150459 A1 | * | 10/2013 | E01C 13/02 |
| WO | 2015005030 A1 | | 1/2015 | |
| WO | WO-2018198463 A1 | * | 11/2018 | |
| WO | WO-2018225098 A1 | * | 12/2018 | |

\* cited by examiner

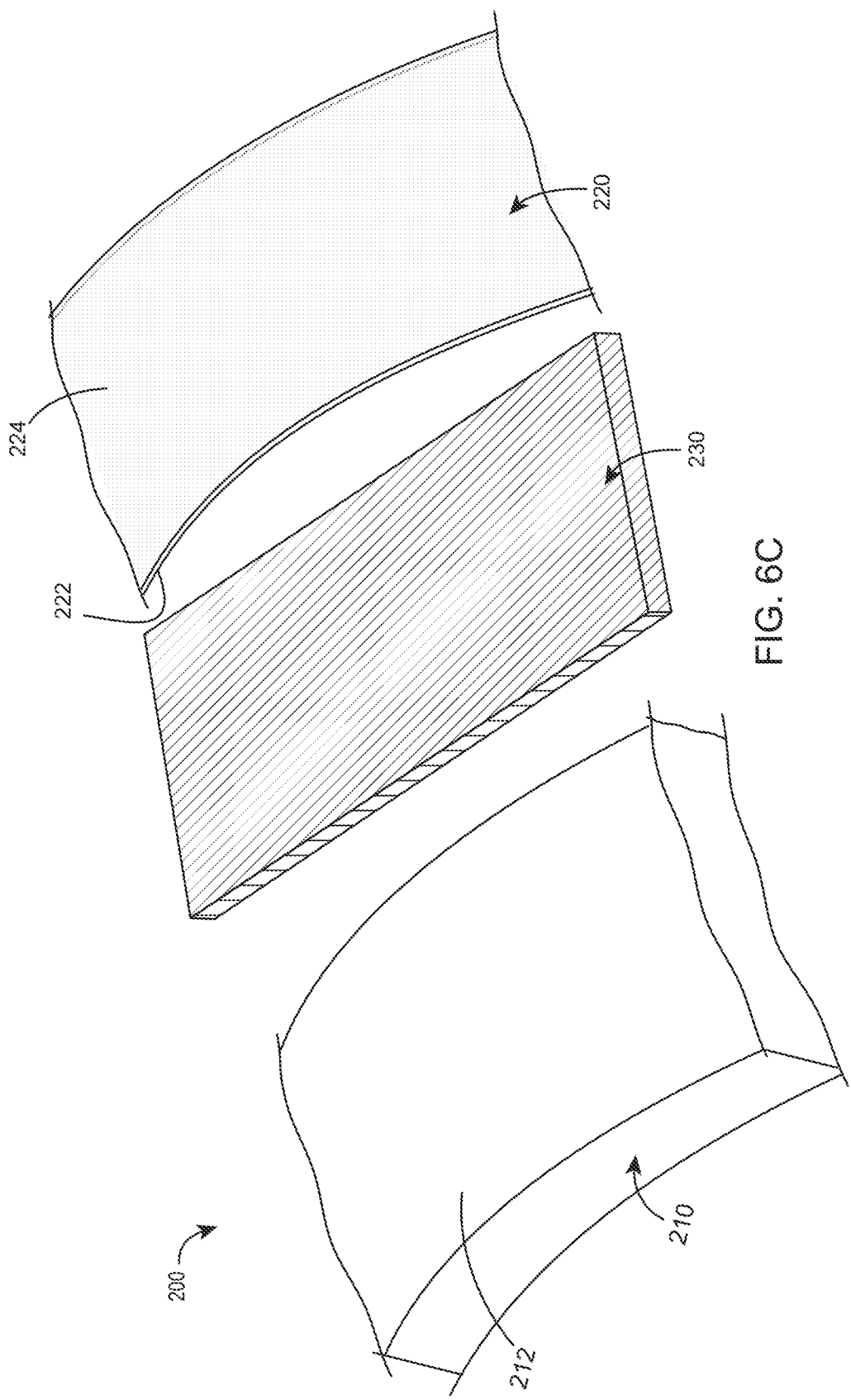

HYBRID STRUCTURE HAVING SUSPENSION QUALITY

CROSS-REFERENCE TO RELATED APPLICATIONS

This application claims priority to Israel Patent Application No. 278158 filed on 19 Oct. 2020 and Israel Patent Application No. 282720 filed on 27 Apr. 2021, the disclosure of each of which is incorporated herein, in its entirety, by this reference.

BACKGROUND

Articles or products having suspension characteristics/quality to improve softness comfort of users are well known. These include cycle seats, motor vehicle seats, chair components, sofas, and interior car parts that suspend or compress on application of force thereon.

Conventionally, the articles are formed of different materials, often including an elastic foam layer compressible to provide suspension quality thereto, covered by an external fabric layer, joined by means of adhesives or by heat treatment or by sawing. One or more of the multiple layers can absorb energy and reduce impact on the users when the users apply a force on the article.

Materials used as layers in the above articles are often thermoset and non-recyclable, adding to the ever-increasing environmental waste. Examples of these materials are Polyurethane (PU), Polyvinyl chloride (PVC), or Ethylene-vinyl acetate (EVA).

CN 107826186 A relates to a bicycle seat cushion configured to be mounted on a tapered end of a bicycle seat for providing increased heat dissipation. The bicycle seat cushion comprises a flexible cushion plate covered by a cloth layer, the flexible plate having a plurality of protrusions which are in contact with a surface of the bicycle seat to isolate the flexible cushion plate from the bicycle seat. Ventilation gaps are formed among all of the protrusions so as to increase the heat dissipation area, to accelerate the heat dissipation of the flexible cushion plate.

US 2019291802 relates to a bike saddle includes, arranged in a saddle, a foam material layer and a surface layer set on and covering a surface of the foam material layer, with a plurality of spaced through holes formed in the foam material layer. A bio-gel layer is formed on an undersurface of the foam material layer. A plurality of bio-gel blocks are respectively filled in the through holes of the foam material layer. Each of the bio-gel blocks has a top end in contact with an underside of the surface layer and a bottom end integrally connected with the bio-gel layer. The bio-gel layer provides a rider with comfortable riding experience and also achieves an antibacterial effect.

GENERAL DESCRIPTION

According to one aspect of the presently disclosed subject matter, there is provided a hybrid structure which can be in the form, or constitute a part, of an article of the above kind, which comprises a thin rigid covering layer connected to a thick rigid core member, via a reducible volume layer therebetween, so as to provide a suspension quality to the structure, when a flexing force is applied to the covering layer.

The hybrid structure can comprise the core member having an outer surface, the covering layer connected to the core member and having an external and an internal surface, and the reducible-volume layer at least at a number of regions between the outer surface of the core member and the internal surface of the covering layer, wherein a combination of material from which the covering layer is made, a thickness of the covering layer, dimensions of the reducible volume is such that, when a flexing force is applied to an area of the covering layer overlying the reducible volume, this area flexes into the reducible volume while maintaining the thickness of the covering layer at said area, and flexes back, thereby providing a suspension quality like an elastic foam without using such foam as the covering layer.

Thus, in the present description and claims, and unless specifically indicated otherwise, the term 'force' or 'flexing force' means a force under which the suspension quality is to be provided, directed at least partially along the thickness direction of the covering layer and the structure, i.e. direction perpendicular to an exterior surface of the covering layer; the term 'rigid' used with respect to a component or material means substantially more rigid than an elastic foam so as to maintain its shape as produced and be either incompressible under the above force (e.g. as the covering layer) or having a substantially lower compressibility under said force than an elastic foam (e.g. as in the core member)'; the term 'thin' with respect to the covering layer means that the thickness of this layer is so small as to allow it to be flexible as indicated above, and the term 'thick' with respect to the core member means that the thickness of this member substantially exceeds that of the covering layer and is thick enough to securely hold the covering layer thereon by means of a connection arrangement.

The covering layer is connected to the core member fixedly and flexibly, wherein in the present description and claims the term "fixedly' means that the connection is permanent, i.e. the covering layer cannot be readily disconnected from the core member, and the term 'flexibly' means that the connection allows the covering layer to flex as described above.

The reducible-volume layer can be constituted by air gaps formed between the core member and the covering layer spaced from each other, e.g. by bumps on the outer surface of the core member and/or on the internal surface of the covering layer; or by such gaps and an elastic foam layer portions accommodated within said gaps; or by an elastic layer sandwiched between the covering layer and the outer surface of the core member which is free of said gaps. When the elastic layer is used, with or without the air gaps, it is configured to be elastically compressed by said areas of the covering layer upon the application of said flexing force thereon.

The connection between the core member and the covering layer via the reducible volume layer can be provided by a suspension-allowing connection arrangement comprising a plurality of connecting elements associated with the covering layer lockingly engaging corresponding connection elements of the core member so as to be free to move in the inward direction of the core member, when said flexing force is applied to areas of the covering layer associated with the connecting elements and having the reducible volume thereunder, with the corresponding connection elements of the core member having this volume thereabove.

The suspension-allowing connection arrangement can be a quick-connection fitting arrangement. For example, the connecting elements can be in the form of lockable protrusions protruding from the internal surface of the covering layer, and the core member can comprise corresponding locking recesses receiving the protrusions, for example, by snap-fitting arrangement. Each lockable protrusion can be associated with an area of the covering layer having the reducible volume thereunder and it can lockingly engage an area of the core member having this volume thereabove. The lockable protrusions can be located at several of the areas of the covering layer received in the corresponding locking recesses in the core member. The arrangement can be such as to allow each protrusion to be moved inwardly within the corresponding recess having a corresponding depth, when the associated area of the covering layer flexes into the reducible volume disposed thereunder. In this case, the thickness of the core member should be large enough to accommodate the locking recesses having the above depth.

Thus, in the hybrid structure described the suspension quality achieved by virtue of combination of parameters of the covering layer and the reducible-volume layer above the core member, is further facilitated by the suspension-allowing connection arrangement.

The parameters of the covering and the reducible-volume layer comprise the thickness and material of the covering layer, the thickness the reducible volume layer and, when this layer comprises reducible volume regions spaced from each other, the geometry of such regions, all selected so as to allow areas of the covering layer overlying the reducible volume regions to flex into said regions and flex back, like a membrane supported by adjacent non-flexing areas of the covering layer, i.e. areas where no force is applied.

When the above regions are in the form of air gaps in the core member spaced from each other, e.g. by bumps in the outer surface of the core member or on the internal surface of the covering layer, the above parameters include the arrangement and dimensions of the gaps defined by the dimensions of the bumps and the spacing regions therebetween, which are selected so as to allow areas of the covering layer overlying the spacing regions to flex into the corresponding gaps and flex back, like a membrane supported by adjacent non-flexing areas of the covering layer. Regarding the parameters of the bumps and the spacing regions, at least a majority of the spacing regions between the bumps can have a length which essentially exceeds a maximal dimension of the bumps along the outer surface of the core member. The bumps can have a height which is smaller than the distance therebetween and at least not less, optionally is greater, than the thickness of the covering layer. The bumps can be arranged in a pattern according to distribution of suspension quality along the covering layer that needs to be achieved.

When the core member is formed with bumps at its outer surface, the covering can have a thickness not exceeding the height of the bumps which defines the depth of the gaps. The core member can have a thickness, which is greater than that of the covering layer at least if measured through said bumps. The thickness of the core member can be essentially greater than that of the covering layer.

When the covering layer is formed with bumps at its internal surface, the height of the bumps defines the height of the gaps and the covering layer can have a thickness at regions between the bumps, which is less than the height of the bumps.

When the core member or the covering layer is formed with bumps, the structure can further comprise an elastic layer formed with holes corresponding to the bumps and configured to be located between the covering layer and the core member such that the bumps protrude from the holes towards the covering layer, allowing the covering layer to rest on at least some of the bumps and to flex inwardly towards or into the elastic layer at areas thereof corresponding to the gaps, upon application of said force. In this case, as well as in the case when the reducible-volume layer is in the form of an elastic layer free of any spacing between its reducible-volume regions, the thickness of the elastic layer/portions can exceed, or at least be not smaller than, that of the covering layer.

When the elastic layer or elastic layer portions constitute the reducible volume layer, the above-described suspension-allowing connection arrangement fixedly and flexibly connects the covering layer to the core member via the elastic layer.

To reduce the weight of the structure, the core member can be less compact than the covering layer, i.e. have a lower bulk density, but still rigid enough to maintain its shape and connection of the connecting elements thereto in use. In addition, the material of the core member can have compressibility higher than that of the covering layer. In this case, when the outer surface of the core member is formed with bumps, the bumps can be compressed when a flexing force is applied at the covering layer at its areas overlying the bumps, and when the interior surface of the covering layer is formed with bumps, areas of the outer surface of the core member underlying the latter bumps can be compressed thereby when a flexing force is applied at the corresponding areas of the covering layer above the bumps thereof.

The suspension-allowing connection arrangement can connect the covering layer to the core member via the reducible-volume layer by a snap-fitting arrangement and can comprise male portions protruding from the internal surface of the covering layer away from its external surface and constituting the lockable protrusions mentioned above, and female portions within the core member open towards the covering layer, constituting the locking recesses mentioned above, configured to lockingly receive therein the male portions/lockable elements passing through the elastic layer.

The fact that in the hybrid structure according to any embodiment thereof, the covering layer and the core member by virtue of which the suspension quality is provided to the structure are not made of an elastic foam material, provides a number of advantages including, but not limited to, the ability to easily perform maintenance of the covering layer such as its cleaning and the ability to connect the covering layer to the core member by mechanical connection, thereby avoiding the need of using adhesive, sawing or the like. Moreover, with the covering layer being rigid, it can be connected to the core member by simple quick connection fitting arrangement, facilitating simple and cost-effective assembly of the hybrid structure.

A further advantage of the above-described hybrid structure is in that all or at least most of its components and connection elements can be made of materials allowing their recycling including thermal processing thereof, without separation between the core member and the layers. This constitutes another aspect of the presently disclosed subject matter, according to which a hybrid structure comprising a plurality of components connected to each other solely by mechanical means, e.g. as in the connection arrangement described above, materials from which the components and the connection elements are made can be such as to allow their recycling including thermal processing thereof, without separation. For example, the materials of at least the core member and the covering layer can comprise the same basic thermoplastic substance or different basic thermoplastic substances that are meltable at the same recycling temperature, with said/each basic substance being, optionally, the only substance within said materials that melts at said temperature.

The above-mentioned basic substance/s in the materials of the components of the hybrid structure can be thermoplastic polymers of the same polymer family, e.g. such as polypropylene family, which in different components of the hybrid structure have different material form. Such components can have a total weight which constitutes more than 90%, optionally, more than 93%, e.g. at least 95%, of the weight of the entire hybrid structure. For example, the material of at least one, thickest, component of the structure can be in the form of an expanded particle foam and the material of at least one or more other components including the connecting elements can be compact continuous materials having a bulk density much higher than the bulk density of the core member. For example, in a hybrid structure comprising a core member, a covering layer and a connection arrangement as described above, the core member having the largest thickness can be made of an expanded particle foam, and the covering layer and its connecting elements are made of a compact material having a bulk density higher than that of the core member. In this case, the core member can be formed by particle-foam molding into a desired shape and the covering layer can be made by injection molding or compression molding, thermoforming, extrusion, vacuum forming, or other technologies, allowing the covering layer and the connecting elements to maintain their shape as produced.

The elastic layer, if any, can have weight, which can constitute a minor fraction of the weight of the entire hybrid structure, so even if it is made of a material not meltable at the above recycling temperature, it can be recycled together with the other components of the hybrid structure without separation therefrom.

It should be mentioned that in the present application and claims, 'recycling without separation' with respect to a hybrid structure, means a conventional plastic recycling process generally including grinding/crushing the entire hybrid structure into small pieces/bits, heating them to allow meltable substance/s therein to melt and subsequently using the mixture of the melted substance with bits of non-meltable substances suspended therein for any suitable purpose.

In all the above examples, components of the connecting arrangement referred to above as connecting and connection elements, or lockable protrusions and locking recesses, or male and female portions can be formed as unitary bodies with the covering layer and core member or can be manufactured separately and then assembled together with one or both of the covering layer and core member.

The following are exemplary embodiments which the hybrid structure according to the presently disclosed subject matter can have:

1. A hybrid structure comprising at least the following:
   a core member having an outer surface
   a covering layer made of a thermoplastic polymer having a flexural modulus substantially higher than that of the core member, the covering layer having an external surface and an internal surface, and produced with at least the internal surface having the same shape as at least a portion of the outer surface of the core member;
   a plurality of bumps protruding from at least one of the outer surface of the core member and the internal surface of the covering layer at least along a portion thereof, the bumps having spacings therebetween defining a plurality of gaps between the internal surface of the covering layer and said spacing regions of the core member;
   a quick-connection fitting arrangement connecting the core member and the covering layer to each other;
   the covering layer and the gaps being configured so that, upon application of a flexing force at the external surface of the covering layer at areas thereof corresponding to the gaps, said area flex inwardly into the gaps and flex back when the force is removed, thereby providing the structure with suspension quality like that of an elastic foam.
2. The structure of embodiment 1, wherein the flexural modulus of the thermoplastic polymer is 110-1800 MPa.
3. The structure of embodiment 1 or 2, wherein the core member has a thickness greater than that of the covering member.
4. The structure of embodiment 3, wherein the thickness of the covering layer is between 0.5-3.5 mm.
5. The structure of any one of the embodiments 1 to 4, wherein the quick-connection fitting arrangement is in the form of a snap fitting arrangement.
6. The structure of embodiment 5, wherein the quick-connection fitting arrangement comprises a plurality of female portions in the core member and a corresponding plurality of male portions protruding from the covering layer and configured to be received within the female portions thereby securely connecting the core member with the covering layer.
7. The structure according to embodiment 6, wherein the covering layer is formed as a unitary body with the male portions.
8. The structure according to any one of claims 1 to 11, wherein the covering layer comprises, at least prior to the assembly of the structure, at least two separate covering layer parts, wherein at least a portion of a periphery of the first part and at least a portion of a periphery of the second part are connected with each other as well as with the core member by a connection member.
9. The structure according to embodiment 8, wherein the connection member is configured to facilitate coupling of one or more external elements with the assembly of the core member with the covering layer.
10. The structure according to any one of embodiments 1 to 9, further comprising an elastic layer formed with holes corresponding to the bumps and located between the covering layer and the core member such that the bumps protrude from the holes, allowing the covering layer to flex, upon application of said force, inwardly into the elastic layer within said gaps, thereby compressing it at areas thereof corresponding to the gaps.
11. The structure according to any one of embodiments 1 to 10, wherein at least a majority of the spacing regions between the bumps have a length which essentially exceeds the thickness of the covering layer.
12. The structure according to any one of embodiments 1 to 11, wherein the thickness of the covering layer is smaller than the height of the bumps.
13. The structure according to any one of embodiments 1 to 12, wherein the bumps adjacent locations where the covering layer is fixed to the core member, have a longer maximal dimension along the outer surface than that of the bumps spaced further from said location.
14. The structure according to any one of embodiments 1 to 13, wherein at least a majority of the bumps are uniformly arranged along at least a majority of the outer surface covered by the core member.

15. A hybrid structure comprising at least the following:
   a core member having an outer surface;
   a covering layer made of a thermoplastic polymer having a flexural modulus substantially higher than that of the core member, the covering layer having an external surface and an internal surface and produced with at least the internal surface having the same shape as at least a portion of the outer surface of the core member;
   a quick-connection fitting arrangement connecting the core member and the covering layer to each other; and
   an elastic layer between the covering layer and the core member;
   the covering layer being configured so that, upon application of a flexing force at an area of the covering layer, this area flexes inwardly into the elastic layer and flexes back when the force is removed, thereby providing the structure with a suspension quality allowing it to behave like an elastic foam without using such foam as the covering layer.

16. The structure according to embodiment 15, wherein the elastic layer is made of an elastic foam material.

17. The structure according to embodiment 15 or 16, wherein the flexural modulus of the thermoplastic polymer is 110-1800 MPa.

18. The structure according to embodiment 17, wherein the covering layer has a thickness of between 0.5-3.5 mm.

19. The structure according to any one of embodiments 15 to 18, wherein the quick-connection fitting arrangement is in the form of a snap fitting arrangement.

20. The structure according to embodiment 19, wherein the quick-connecting fitting arrangement comprises a plurality of female portions in the core member and a corresponding plurality of male portions protruding from the covering layer and configured to be received within the female portions thereby securely connecting the core member with the covering layer.

21. The structure according to embodiment 20, wherein the covering layer is formed as a unitary body with the male portions.

22. The structure according any one of the preceding embodiments, wherein the core member, the covering layer and the elastic layer, if any, are made of materials, allowing their recycling without separation.

23. The structure according to any one of the proceeding embodiments, wherein materials from which the core member and the covering layer are made, comprise the same basic substance and differ in material form.

24. The structure according to embodiment 23 when dependent directly or indirectly on any one of embodiments 10 and 15, wherein a material from which the elastic layer is made comprises the same basic substance and differs in form from the materials of the core member and the covering layer.

25. The structure according to any one of the preceding embodiments, wherein the covering layer maintains its thickness when flexing upon the application of said flexing force.

26. The structure according to any one of the preceding embodiments, wherein a material from which the core member is made is an expanded particle foam.

27. The structure according to any one of the preceding embodiments, wherein the covering layer has a bulk density higher than that of the core member.

28. The structure according to any of the preceding embodiments, wherein the materials from which the core member and the covering layer are made comprise polypropylene.

29. The structure according to embodiment 28, wherein the material from which the elastic layer, if any, is made comprises polypropylene.

30. The structure according to any one of the preceding embodiments, at least one of the core member and the covering layer has a curved shape of at least one of its surfaces.

31. A hybrid structure comprising:
   a core member having an outer surface;
   a covering layer having an external surface and an internal surface, and being produced with at least the internal surface having the same shape as at least a portion of the outer surface of the core member,
   a plurality of bumps protruding from at least one of the outer surface of the core member and the internal surface of the covering layer at least along a portion thereof, the bumps having spacings therebetween;
   the covering layer being configured to be fixedly attached to the core member so as to create a plurality of gaps between the internal surface of the covering layer and the outer surface of the core member, the gaps being defined by said spacings,
   the covering layer and the gaps being configured so that, upon application of a force at the external surface of the covering layer at areas thereof corresponding to the gaps, said areas flex inwardly into the gaps and flex back when the force is removed.

32. A hybrid structure according to embodiment 31, wherein the core member and the covering layer are configured to be fixedly connected to each other by a quick-connection fitting arrangement such as, for example, snap-fitting.

33. A hybrid structure comprising:
   a core member having an outer surface;
   a covering layer having an external surface and an internal surface, and produced with at least the internal surface having the same shape as at least a portion of the outer surface of the core member;
   a plurality of bumps protruding from at least one of the outer surface of the core member and the internal surface of the covering layer at least along a portion thereof, the bumps having spacings therebetween defining a plurality of gaps between the internal surface of the covering layer and the outer surface of the core member;
   a quick-connection fitting arrangement connecting the core member and the covering layer to each other;
   the covering layer and the gaps being configured so that, upon application of a flexing force at the external surface of the covering layer at areas thereof corresponding to the gaps, said area flex inwardly into the gaps and flex back when the force is removed, thereby providing the structure with suspension quality like that of an elastic foam.

34. A hybrid structure according to embodiment 31, 32 or 33, wherein at least a majority of the spacing regions between the bumps have a length which essentially exceeds a maximal dimension of the bumps along the outer surface of the core member.

35. A hybrid structure according to any one of embodiments 31 to 34, wherein the bumps have a height which is smaller than the distance therebetween and at least not less, optionally is greater, than the thickness of the covering layer.

36. A hybrid structure according to any one of embodiments 31 to 35, wherein the covering layer has a thickness not exceeding the height of the bumps.

37. A hybrid structure according to any one of embodiments 32 to 36, wherein the quick-connection fitting arrangement configured to fixedly connect the covering layer to the core member comprises male portions protruding from the internal surface of the covering layer away from its external surface and female portions in the core member open towards the covering layer configured to lockingly receive therein the male portions.

38. A hybrid structure according to embodiment 37, wherein the male portions are formed as a unitary body with the covering member.

39. A hybrid structure according to embodiment 36, 37 or 38, wherein the male portions are located at several of said areas of the covering layer overlying the spacing regions, and the female portions are located in the corresponding spacing regions.

40. A hybrid structure according to any one of embodiments 30 to 39, further comprising an elastic layer formed with holes corresponding to the bumps and configured to be located between the covering layer and the core member such that the bumps protrude from the holes, allowing the covering layer to flex inwardly towards or into the elastic layer at areas thereof corresponding to the gaps, upon application of said force.

41. A hybrid structure according to any one of embodiments 30 to 40, wherein the core member, the covering layer and the elastic layer, if any, are made of materials, allowing their recycling without separation.

42. A hybrid structure having a suspension quality, comprising:
   a core member having an outer surface;
   a covering layer having an external surface and an internal surface, the covering layer being produced with at least the internal surface having the same shape as at least a portion of the outer surface of the core member, the covering layer being configured to be fixedly attached to the core member;
   an elastic layer, optionally made of a foam material, between the covering layer and the core member;
   the covering layer being configured so that, upon application of a force at an area of the covering layer, this area flexes inwardly into the elastic layer and flexes back when the force is removed, to provide said suspension quality.

43. A hybrid structure according to embodiment 42, wherein the core member and the covering layer are configured to be fixedly connected to each other, via the elastic layer, by a quick-connection fitting arrangement such as, for example, snap-fitting.

44. A hybrid structure comprising:
   a core member having an outer surface;
   a covering layer having an external surface and an internal surface and produced with at least the internal surface having the same shape as at least a portion of the outer surface of the core member;
   a quick-connection fitting arrangement connecting the core member and the covering layer to each other; and
   an elastic layer between the covering layer and the core member;
   the covering layer being configured so that, upon application of a flexing force at an area of the covering layer, this area flexes inwardly into the elastic layer and flexes back when the force is removed, thereby providing the structure with a suspension quality allowing it to behave like an elastic foam without using such foam as the covering layer.

45. A hybrid structure according to any one of embodiments 42, 43 and 44, wherein the covering layer has a thickness, which does not exceed the thickness of the elastic layer.

46. A hybrid structure according to any one of embodiments 42 to 45, wherein the core member has a thickness greater than that of the covering layer.

47. A hybrid structure according to any one of embodiments 42 to 46, wherein the core member is made of a material having a lower bulk density than that of the covering layer.

48. A hybrid structure according to any one of embodiments 43 to 47, wherein the quick-connection fitting arrangement configured to fixedly connect the covering layer to the core member via the elastic layer comprises male portions protruding from the internal surface of the covering layer away from its external surface and female portions formed in the core member and open towards the covering layer.

49. A hybrid structure according to embodiment 48, wherein the male portions are formed as a unitary body with the covering member.

50. A hybrid structure according to embodiment 47, 48 or 49, wherein the male portions are located at several of said areas of the covering layer and female portions are formed in the corresponding locations of the outer surface of the core member.

51. A hybrid structure according to any one of embodiments 41 to 50, wherein the core member, the covering layer and the elastic layer are made of materials, allowing their recycling without separation.

52. A hybrid structure comprising a core member having an outer surface and a shape dictated by the intended use of the hybrid structure, a reducible-volume layer associated with the outer surface of the core member and having a reducible volume at least at a number of regions thereof, and a covering layer fixedly connected to the core member, wherein a combination of material from which the covering layer is made, a thickness of the covering layer, and dimensions of the reducible volume is such that, when a flexing force is applied to an area of the covering layer overlying the reducible volume, this area flexes into the reducible volume while maintaining the thickness of the covering layer at said area, and flexes back, thereby providing a suspension quality like an elastic foam without using such foam as the covering layer.

53. A hybrid structure according to embodiment 52, wherein the reducible-volume layer is constituted by one of the following:
   air gaps formed in the core member and spaced from each other and, optionally, an elastic foam layer portions accommodated within said gaps; or
   an elastic layer disposed underneath the covering layer.

54. A hybrid structure according to embodiment 52 or 53, further comprising a quick-connection fitting arrangement including a plurality of lockable protrusions protruding from the internal surface of the covering layer and a corresponding plurality of locking recesses in the core member each configured to lockingly receive therein a corresponding lockable protrusion.

55. A hybrid structure according to claim 54, wherein each lockable protrusion is formed at an area of the covering layer having the reducible volume thereunder and the corresponding locking recess is formed so as to have this volume thereabove.
56. A hybrid structure according to embodiment 54 or 55, wherein the lockable protrusion and the locking recess have such longitudinal dimensions as to allow the former to be moved inwardly within the latter when the associated area of the covering layer flexes into the reducible volume disposed thereunder.
57. A hybrid structure according to embodiment 54, 55 or 56, wherein the lockable protrusions are formed as a unitary body with the covering member.
58. A hybrid structure according to any one of embodiments 54 to 57, wherein the lockable protrusions are located at several of said areas of the covering layer and the locking recesses are formed in the corresponding number of locations of the outer surface of the core member.
59. A hybrid structure according to any one of embodiments 31 to 58, wherein materials from which the core member and the covering layer are made comprise the same basic substance and differ in material form and/or physical properties and, if the structure comprises an elastic layer between the covering layer and the core member, this elastic layer is also made of a material comprising said basic substance.
60. A hybrid structure according to embodiment 59, wherein said materials are thermoplastic polymer materials.
61. A hybrid structure according to embodiment 60, wherein the material of the core member is in the form of an expanded particle foam.
62. A hybrid structure according to embodiment 61, wherein the covering layer has a bulk density higher than that of the core member.
63. A hybrid structure according to any one of embodiments 59 to 62, wherein said basic substance is polypropylene.
63. A hybrid structure comprising a core member, a covering member fixedly connected thereto so as to be able to flex into or towards the core member and, optionally, an elastic layer therebetween under at least some areas of the covering layer, wherein materials from which the core member, the covering layer and the elastic layer, if any, are made comprise the same basic substance and differ in form so as to allow the structure to be recycled without separating the covering layer and the elastic layer, if any, from the core member.
64. A hybrid structure according to embodiment 63, wherein said materials are thermoplastic polymer materials.
65. A hybrid structure according to embodiment 64, wherein the material of the core member is in the form of an expanded particle foam.
66. A hybrid structure according to embodiment 64 or 65, wherein the material of the covering layer is a compact continuous material, having a density substantially higher than that of the core member.
67. A hybrid structure according to any one of embodiments 31 to 66, wherein the material from which the covering layer is made, has a flexural modulus substantially higher than that of the material of the core member.
68. A hybrid structure according to embodiment 67, wherein the flexural modulus of the material of which the covering layer is made is in the range 110-1800 MPa.
69. A hybrid structure according to any one of embodiments 31 to 68, wherein the thickness of the covering layer is in the range of 0.5-3.5 mm.
70. A hybrid structure according to any one of the preceding embodiments, wherein at least the outer surface of the core member has a curved shape and the covering layer has a corresponding curved shape to suit the curvature of the core member.
71. A hybrid structure according to any one of the preceding embodiments, wherein the covering layer is made of a material which is incompressible under said force.
72. A hybrid structure according to any of the preceding embodiments, wherein the core member is rigid.
73. A hybrid structure according to any one of embodiments 31 to 72, wherein the covering layer comprises at least two separate covering layer parts, wherein at least a portion of a periphery of the first part and at least a portion of a periphery of the second part are connected with each other as well as with the core member by a connection member.
74. A hybrid structure according to embodiment 73, wherein the connection element has a male portion and the core member has a female portion configured to securely receive therein the male portion of the connection element.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIG. 6C is an exploded view of the structure illustrated in FIG. 6B.

DETAILED DESCRIPTION OF EMBODIMENTS

Figure 1A:
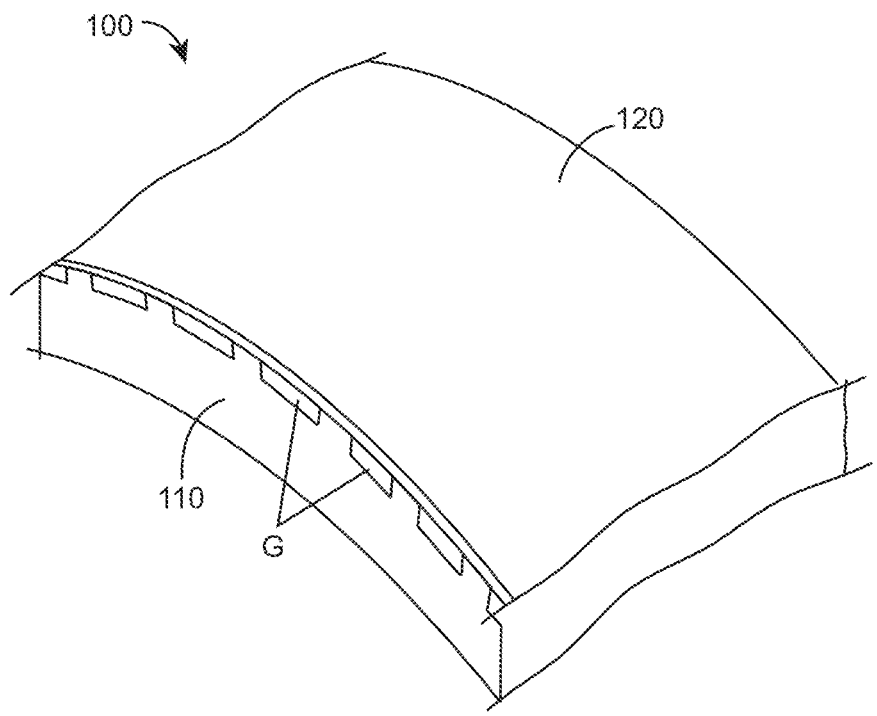
FIG. 1A is a perspective view of a structure in accordance with one example of the subject matter of the present application.

FIGS. 1A-1D illustrate a hybrid structure having a suspension quality, in accordance with one example of a first aspect of the subject matter of the present application. The hybrid structure shown in these Figures constitutes an exemplary portion of an article 100 to be incorporated into a product to provide a feeling of softness to a user. The product can, for example, be a cycle seat, motor vehicle seat, chair component, sofa, interior car parts, or any such part or component that requires the outer layer to provide a feeling of softness.

The hybrid structure/article 100 includes a core member 110 and a covering layer 120. The core member 110 has an outer surface 112 facing in the direction of the covering layer 120. The core member 110 is rigid and has a plurality of bumps 115 protruding from the outer surface 112 in the direction of the covering layer and spaced from each other by spacing regions 116 between any two adjacent bumps 115.

According to the illustrated embodiment, the bumps are unitarily formed with the core member 110. However, in another embodiment (not shown), the bumps 115 can be separately manufactured, and then assembled together with the core member 110. In the latter case, the bumps 115 can be formed of the same or different material as that of the core member 110, e.g. the material used in the bumps 115 can comprise the same basic substance as that of the core member but be in a different form and/or have different physical characteristics.

The covering layer 120 has an internal surface 122 facing in the direction of the core member 110 and an external surface 124 facing towards the exterior of the article 100, and it has a predetermined shape which can be the same shape as that of the outer surface 112 of the core member 110. The covering layer is produced in this shape, i.e. has it prior to assembly of the core member 110 and the covering layer 120, as can be best seen in FIG. 1C. Whilst in the present embodiment the entire covering layer has the same shape as the outer surface of the core member, in another embodiment (not shown), only the internal surface of the covering layer can have such a shape.

Figure 1B:
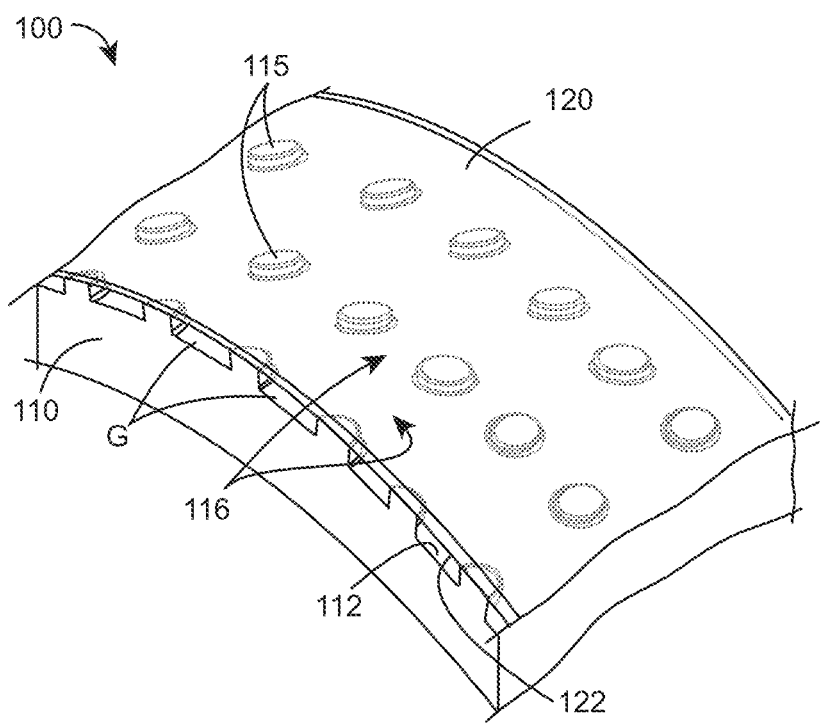
FIG. 1B is the same view of the structure as that in FIG. 1A, with its covering layer being shown as transparent for the purpose of illustration.
Figure 1C:
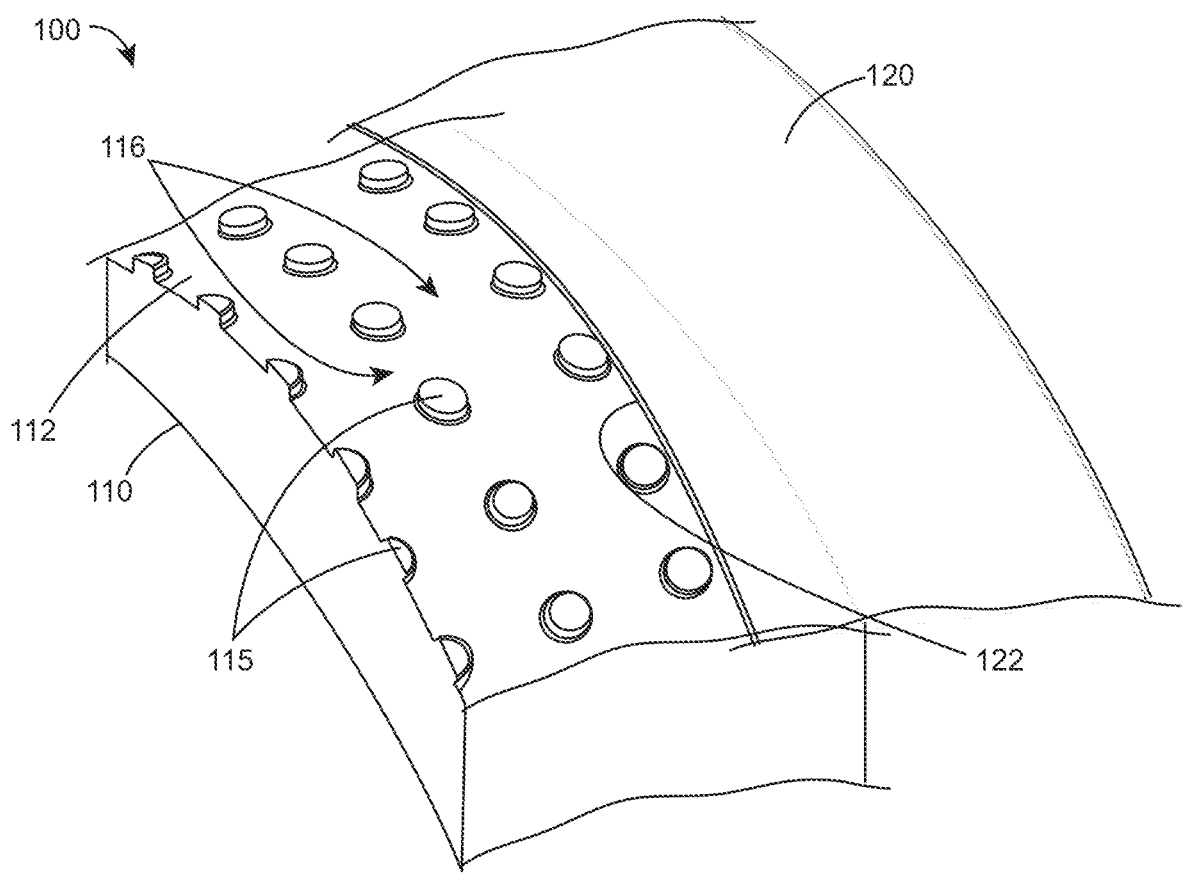
FIG. 1C is an exploded view of the structure illustrated in FIG. 1A.

The covering layer 120 is configured to be fixedly attached to the core member 110 by any suitable means, some examples of which are described in detail later herein below. The covering layer 120, when attached to the core member 110, covers the outer surface 112 of the core member 110 such that, as seen in FIGS. 1A and 1B, the internal surface 122 of the covering layer 120 rests on the bumps 115. As further seen in FIGS. 1A and 1B, when the internal surface 122 rests on the bumps 115, a plurality of gaps G are formed between the covering layer 120 and the core member 110 at locations where the internal surface 122 does not contact the bumps 115. In other words, the gaps G are formed at locations corresponding to the spacing regions 116 and are defined by the spacing regions 116. According to the illustrated embodiment, the gaps G are filled with air. According to another embodiment, the gaps G can comprise an elastic material, as described in detail later herein below.

Figure 1D:
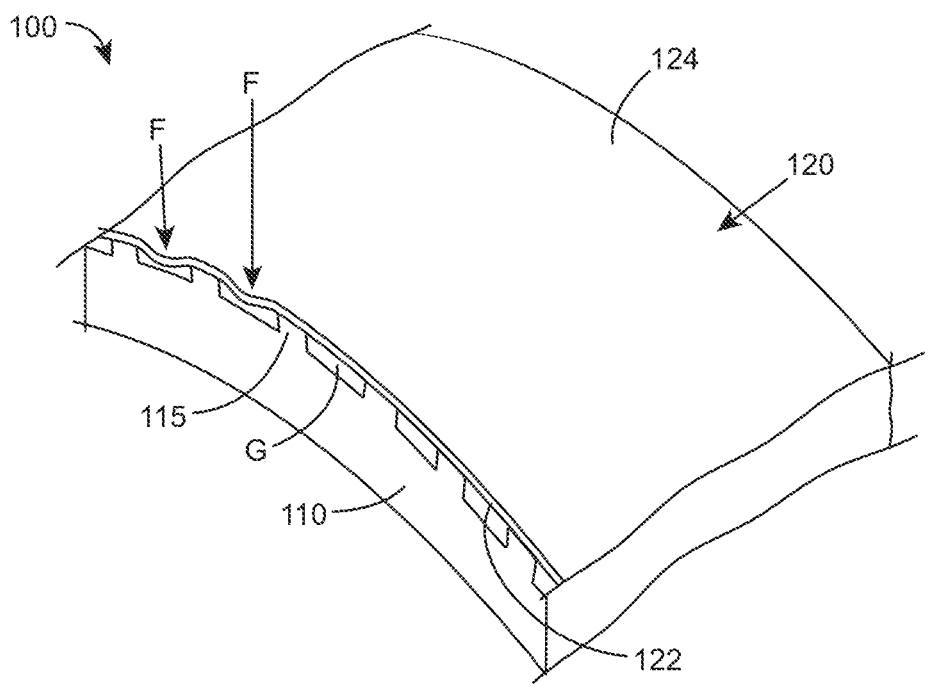
FIG. 1D is the same view of the structure as that of FIG. 1A, showing the structure in operation.

The covering layer 120 and the gaps G are so configured, i.e. the covering layer is made of such material and has such a thickness, and gaps G have such dimensions that, when a flexing force F is applied at the external surface 124 of the covering layer 120 at areas above the gaps G, the covering layer 120 slightly flexes inwardly into the gaps G, as best seen in FIG. 1D, and when the force F is removed, it flexes back to its normal shape. Thus, the suspension characteristics are achieved and the covering layer 120 provides a feeling of softness to the article like that of an elastic foam. In other words, the covering layer and the gaps are configured so that areas of the covering layer 120 associated with the gaps G each behave like a membrane, when the force F is applied thereto, held in place by adjacent areas of the covering layer supported by the bumps, with both the external surface 124 as well as the internal surface 122 of the covering layer 120 at these areas flexing inwardly into the gaps G, as shown in FIG. 1D. Thus, when the force F is applied at the external surface 124 of the covering layer 120, and the covering layer 120 flexes into the gaps G, the volume of the gaps is reduced.

In addition, the bumps 115 can be configured to be compressible under the above force to impart further suspensibility to the covering layer at areas thereof overlying the bumps and thus increased feeling of softness to the article. In another embodiment, the bumps 115 can be configured to be rigid. The compressibility/rigidity of the bumps 115 can be selected based on the utility of the final product in which the article is to be incorporated.

For example, the covering layer can have a flexural modulus substantially higher than that of the core member, e.g. between 110-1800 MPa, and it can have a thickness of between 0.5-3.5 mm. The core member can have any thickness dictated by the function of the structure in the article, which in any case is substantially greater than that of the covering layer, and a material from which it can be made can have a flexural modulus lower, but compressibility higher, than that of the covering layer, thereby further improving suspensibility to the covering layer at areas thereof overlying the bumps.

Materials from which the core member 110 and the covering layer 120 can be made of are described at the end of the present description.

Apart from the material of the covering layer 120, the thickness of the covering layer 120, the length of spacing regions 116, the maximal dimension of the bumps 115 along the outer surface 112, and the height of the bumps 115, and correlations therebetween should be such as to allow the covering layer 120 to flex into the gaps G and effect the suspension characteristics of the article. For example, at least 30% of the area of the internal surface 122 of the covering layer 120 should correspond to the spacing regions 116, i.e., should be free of contact with bumps 115, thereby sitting on air to be able to flex inwardly into the air and thus reduce its volume, upon application of force. Thus, the covering layer 120 is capable of flexing upon application of force only when mounted so as to have reducible volume underneath, such as the gaps G in the present example and it would not be able to flex if placed over a rigid, incompressible surface.

Figure 2:
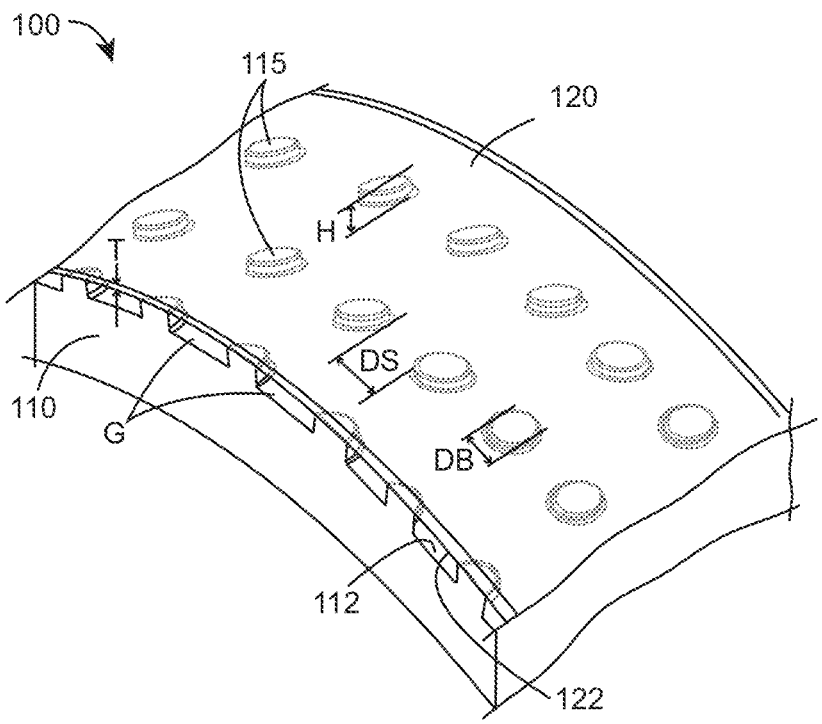
FIG. 2 is the same view of the structure as that in FIG. 1B, showing dimensions of its bumps and the spacing regions.

As shown in FIG. 2, the length of at least a majority of spacing regions 116, or in other words the distance between a majority of pairs of adjacent bumps 115, referred to herein as DS, is at least not shorter and, preferably longer, than the maximal dimension of each of a majority of the bumps 115 along the outer surface 112, referred to herein as DB. Also, the length DS of the spacing regions 116 is greater than the height H of the bumps 115 taken perpendicular to the outer surface 112. Also, the thickness T of the covering layer 120 is smaller than the length DS of the spacing regions 116 and does not exceed the height H of the bumps.

Figure 3:
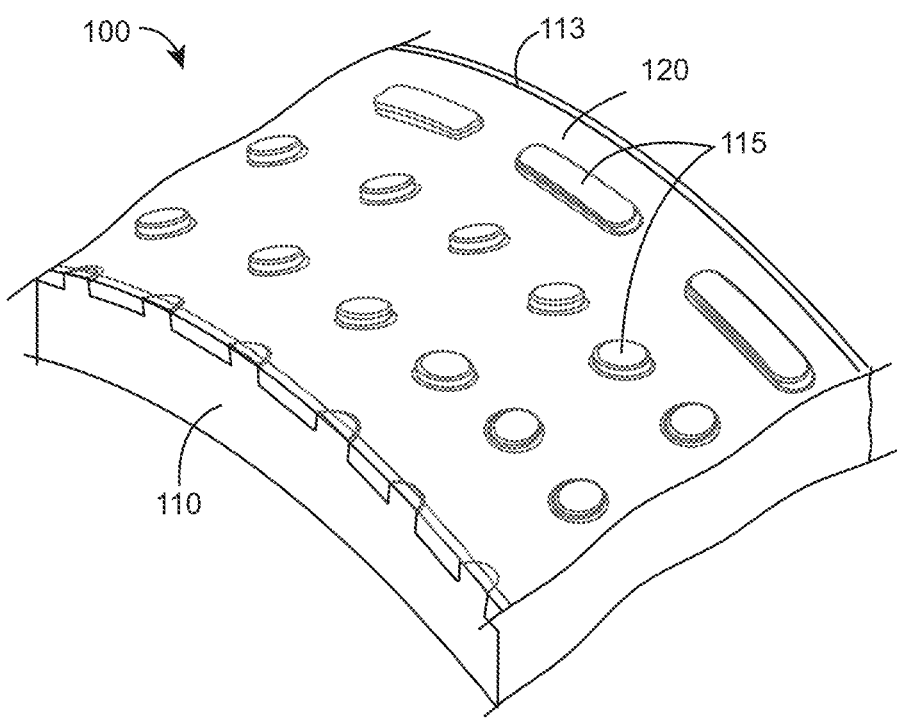
FIG. 3 is a perspective view of a structure according to another example of the subject matter of the present application, in which at least some of its bumps can have shape and dimensions different from those of other bumps.

At least a majority of the bumps 115 can be arranged in a uniform manner over a majority of the outer surface 112. Also, at least a majority of the bumps 115 can have the same maximal dimensions along the outer surface 112. In the embodiment illustrated in FIG. 2, all the bumps in the illustrated portion of the article 100 have identical shape and dimensions. According to another embodiment, for example as illustrated in FIG. 3, at least some of the bumps 115 have longer maximal dimension DB along the outer surface 12 than that of at least some other of the bumps 115. For example, the bumps 115 adjacent a location where the covering layer 120 can be fixed to the core member 110, in this case a periphery 113 of the article or its portion, can have a longer maximal dimension DB along the outer surface 112 than that of the bumps 115 spaced further from said location. One option of the latter embodiment can be that the article or its portion has a single continuous protrusion extending along the periphery thereof.

Figure 4A:
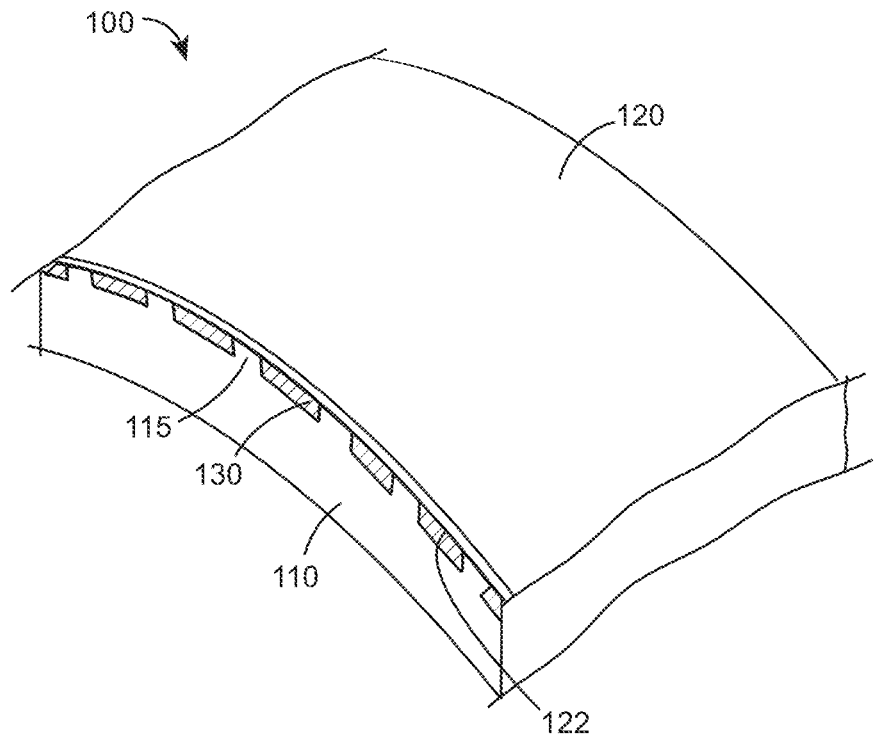
FIGS. 4A-4D show views of a structure according to a further example of the subject matter of the present application, corresponding to those of FIGS. 1A-1D respectively, with an additional elastic layer.
Figure 4B:
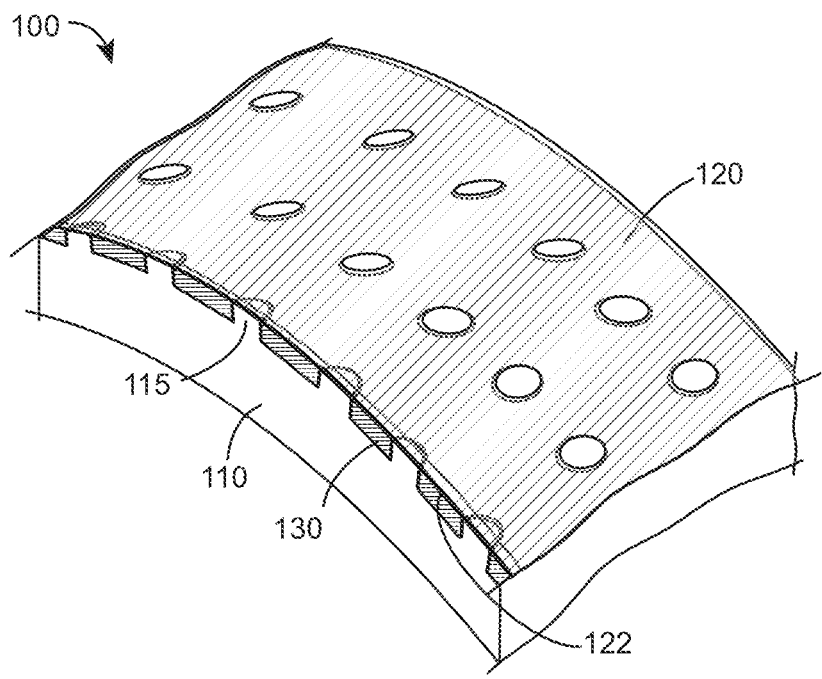
Figure 4C:
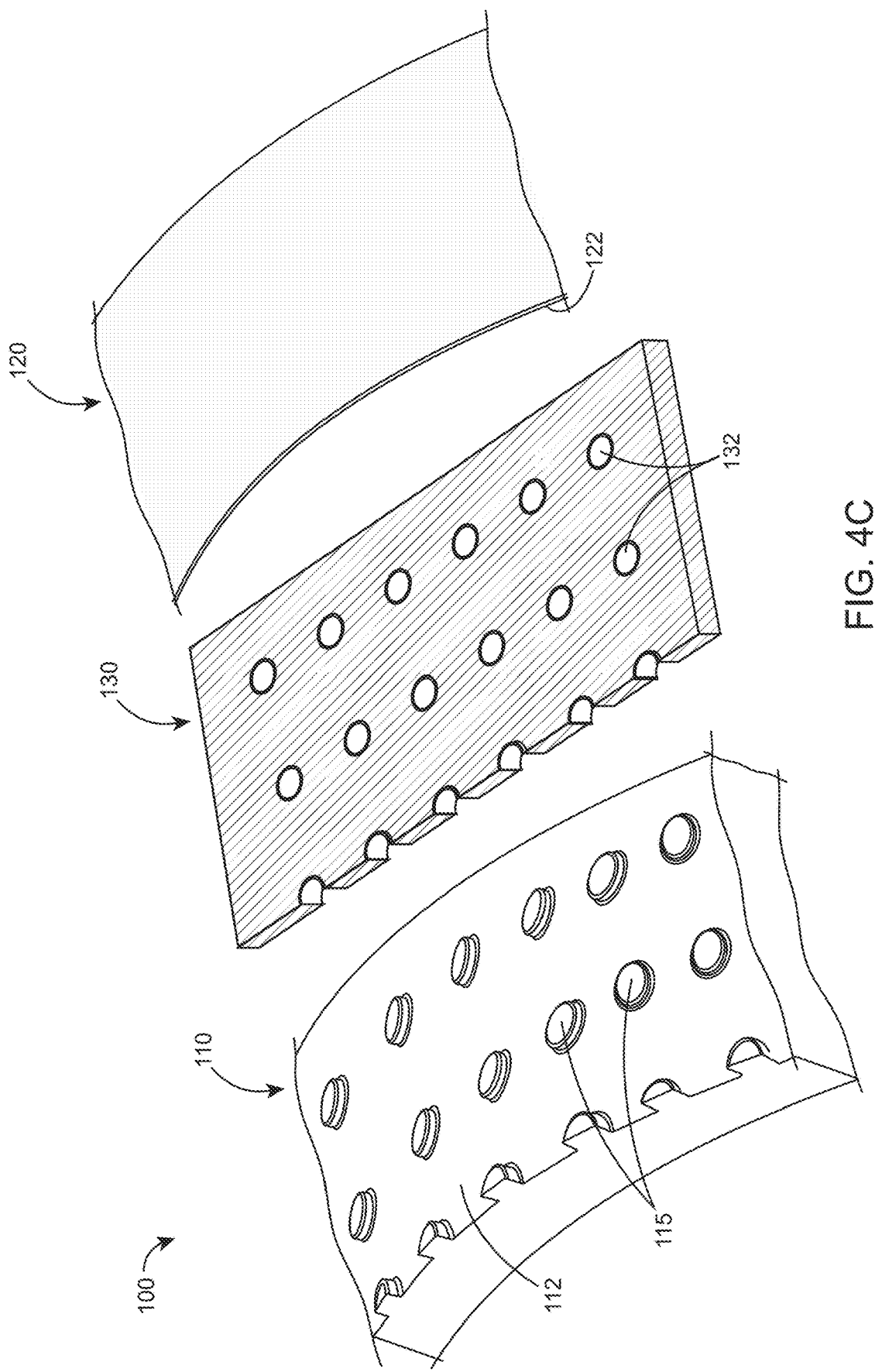
Figure 4D:
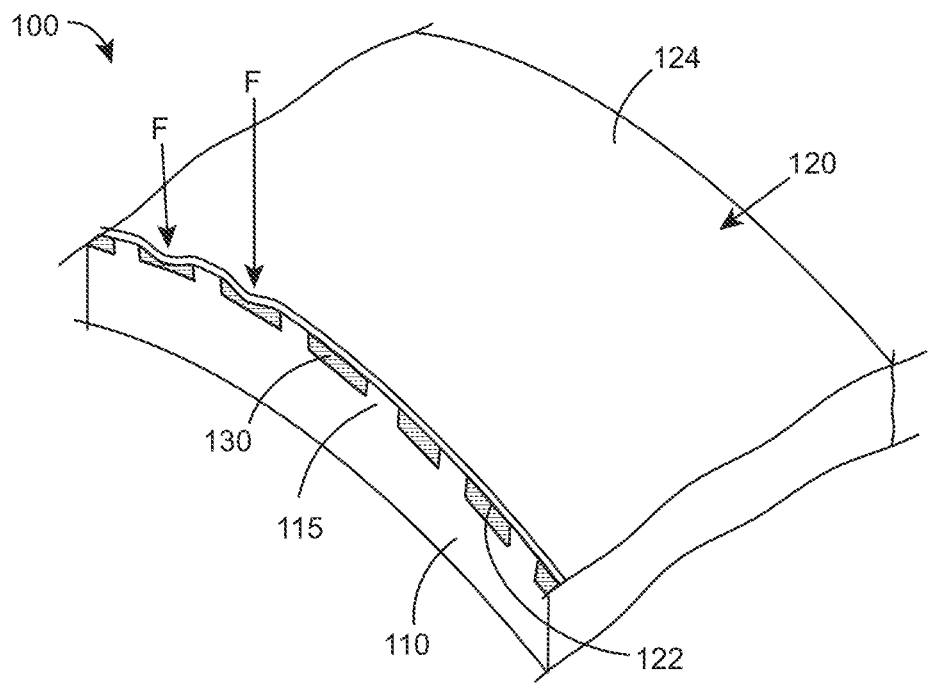

FIGS. 4A-4D illustrate a hybrid structure constituting a portion of another article 100 having the same components and features as described above with respect to the article illustrated in FIGS. 1A to 3 and an additional elastic layer 130. The elastic layer 130 is located between the core member 110 and the covering layer 120 and includes holes 132 corresponding in shape and dimensions to the bumps 115 such that the bumps 115 protrude from the outer surface 112 of the core member 110 towards the internal surface 122 of the covering layer 120 through the holes 132. The thickness of the elastic layer does not exceed or at least does not essentially exceed the height H of the bumps 115 so that the elastic layer 130 allows the covering layer 120 to rest on the bumps 115 at least when the covering layer is flexed towards the core member. The elastic layer 130 fills in at least a part of the volume defined by gaps G, constituting an reducible volume therewith, configured such that when the force F is applied on the external surface 124 of the covering layer 120 at areas thereof above the portions of the elastic layer 130 disposed in the gaps, or in other words the portions where the covering layer 120 does not rest on the bumps 115, the covering layer 120 flexes inwardly towards or into the elastic layer 130 (as shown in FIG. 4D) depending on the thickness of the elastic layer 130. Thus, the suspension characteristics can be adjusted and the covering layer 120 and the elastic layer 130 together provide a desired feeling of softness to the article like that of elastic foam.

It is to be noted herein that, as best seen in FIG. 4C, the elastic layer 130 need not be produced with a shape corresponding to that of the outer surface 112 of the core member 110 and for example, as seen in FIG. 4C, the layer 130 can be planar as compared to the outer surface 112 of the core member 110, since being elastic it can suit its shape to that of the core member and the covering layer upon the assembly of the article. Material from which the elastic layer 130 can be made is described at the end of the present description.

In the embodiment of FIGS. 4A to 4D, the thickness of the elastic layer 130 is equal to the height H of the bumps 115 such that the internal surface 122 of the covering layer 120 rests together on the bumps 115 as well as the elastic layer 130. In such a case, the covering layer 120 flexes inwardly into the elastic layer 130 upon application of the force F on the external surface 124 of the covering layer 120 at positions corresponding to the gaps between the bumps. When the thickness of the elastic layer 130 is smaller than the height H of the bumps 115 such that the internal surface 122 of the covering layer 120 rests only on the bumps 115, the covering layer 120 will flex inwardly between the bumps towards the elastic layer 130 upon application of the force F on the external surface 124 of the covering layer 120 at areas corresponding to the gaps between the bumps.

Figure 5A:
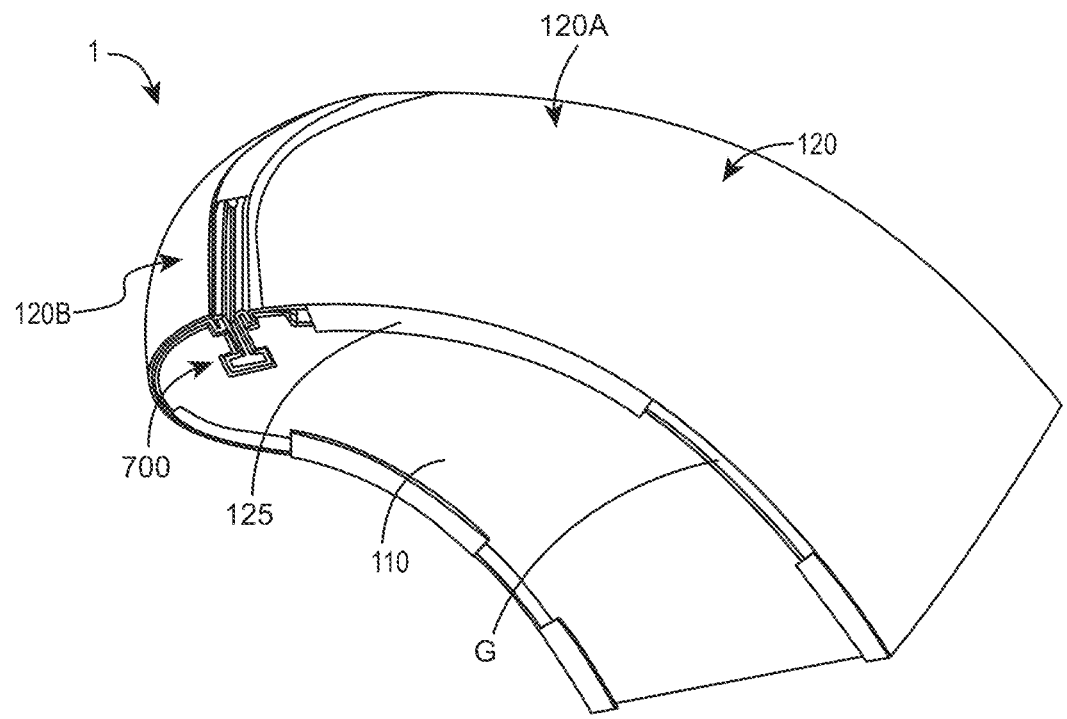
FIG. 5A is a perspective view of a portion of an article in accordance with a further example of the subject matter of the present application.
Figure 5B:
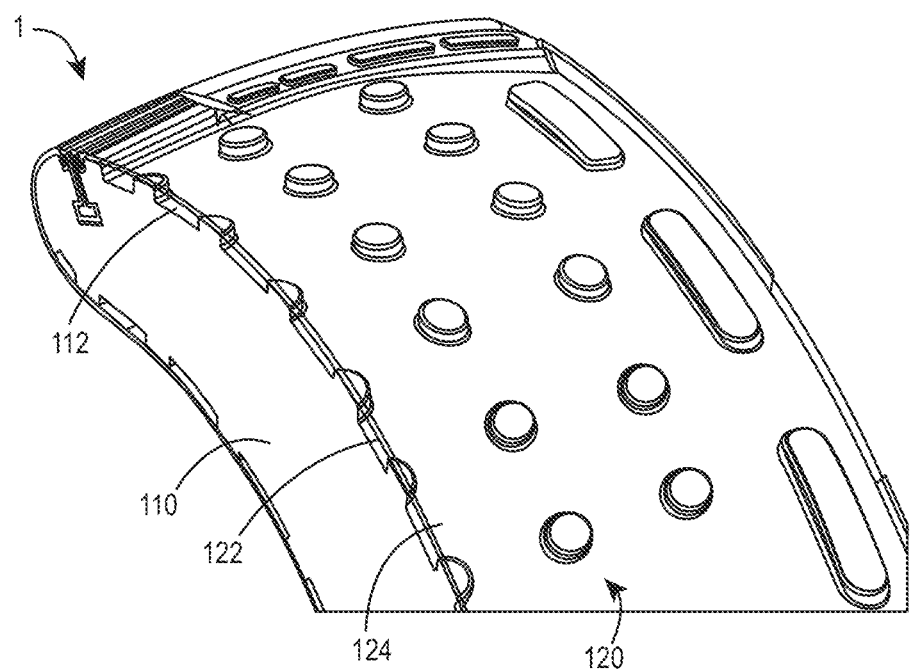
FIG. 5B is another perspective view of the portion of the article in FIG. 5A, with its covering layer being shown as transparent for the purpose of illustration.

FIGS. 5A-5B illustrate a hybrid structure constituting a portion of an article 1 having the same components and features as in the article 100 described above with reference to FIGS. 1A-3, but having a covering layer comprising two parts. More particularly, the article 1 includes a core member 110, bumps 115, and a covering layer 120 as those described above with reference to FIGS. 1A-3, but the covering layer 120 comprises two separate covering layer parts 120A and 120B connected to each other, as well as to the core member 110, at the respective peripheries. In other embodiments, the covering layer 120 can be molded as a single part, or any number of parts depending on the shape, size, structure, and/or utility of the final product where the article is to be incorporated.

The parts 120A and 120B can be connected to each other and to the core member by any suitable means. In the example illustrated in FIGS. 5A and 5B, by a connection member 700 as described in detail herein further below with reference to FIG. 7. Further, in the example of FIGS. 5A and 5B, the covering layer 120 includes a skirt 125 extending towards the core member 110 at least from some portion of the periphery of the covering layer 120, thereby improving rigidity of the article at its periphery. The skirt can also cover the core member, or at least some portions thereof including the gaps G, from the sides.

FIGS. 6A-6D illustrate a hybrid structure constituting a portion of an article 200 having a suspension quality, according to a further example of the subject matter of the present application, in views corresponding to those of article 100 shown by FIGS. 1A-1D respectively. The portion shown in these Figures represents an exemplary small section of the article 200 to be incorporated into a product to provide a feeling of softness to a user. The product can be a cycle seat, motor vehicle seat, chair component, sofa, interior car parts, or any such part or component that requires the outer layer to provide a feeling of softness.

The article 200 includes a core member 210, a covering layer 220, and an elastic layer 230. The core member 210 includes an outer surface 212 facing an exterior of the article. The covering layer 220 has the same features as the covering layer 120 of the article 100 and has an internal surface 222 and an opposite external surface 224. The internal surface 222 of the covering layer 220 has a predetermined shape, i.e. is produced with this shape and thus has this shape at least prior to assembly of the core member 210 with the covering layer 220.

The covering layer 220 is configured to be fixedly attached to the core member 210 via the elastic layer by any suitable means, some examples of which are described in detail later herein below. The elastic layer 230 is located between the core member 210 and the covering layer 220 such that, when assembled, the elastic layer is sandwiched between the outer surface 212 of the core member 210 and the internal surface 222 of the covering layer 220. As best seen in FIG. 6C, the elastic layer 230 need not be produced with a shape corresponding to that of the outer surface 212 of the core member 210 prior to assembly of the article. Thus, in the present example, as seen in FIG. 6C, the elastic layer 230 is planar as compared to the outer surface 212 of the core member 210, and being elastic takes the shape that of the outer surface 212 of the core member 210 upon assembly of the article.

Figure 6A:
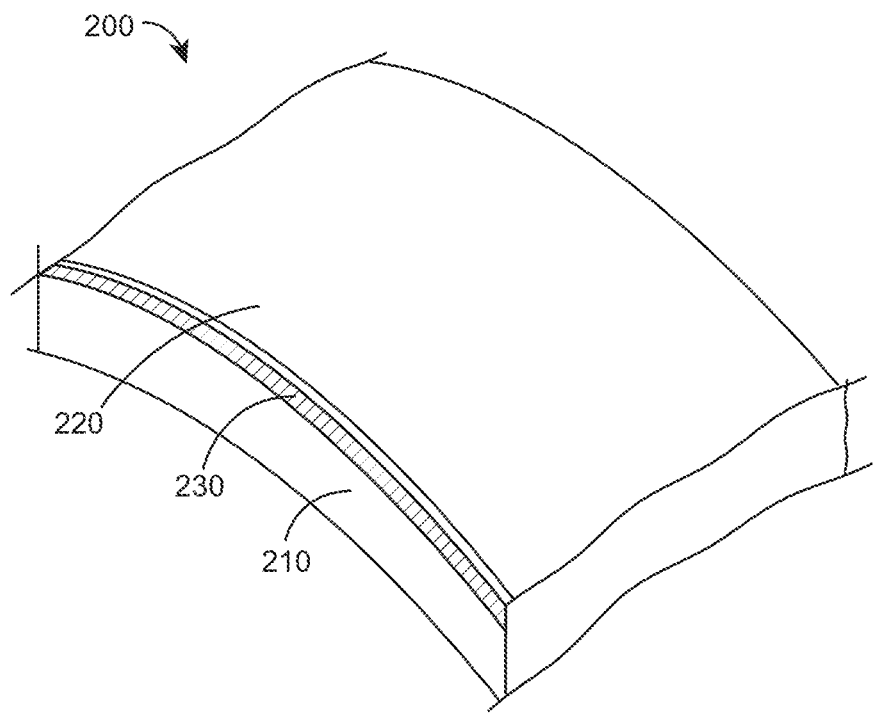
FIG. 6A is a perspective view of a structure in accordance with a still further example of the subject matter of the present application.
Figure 6B:
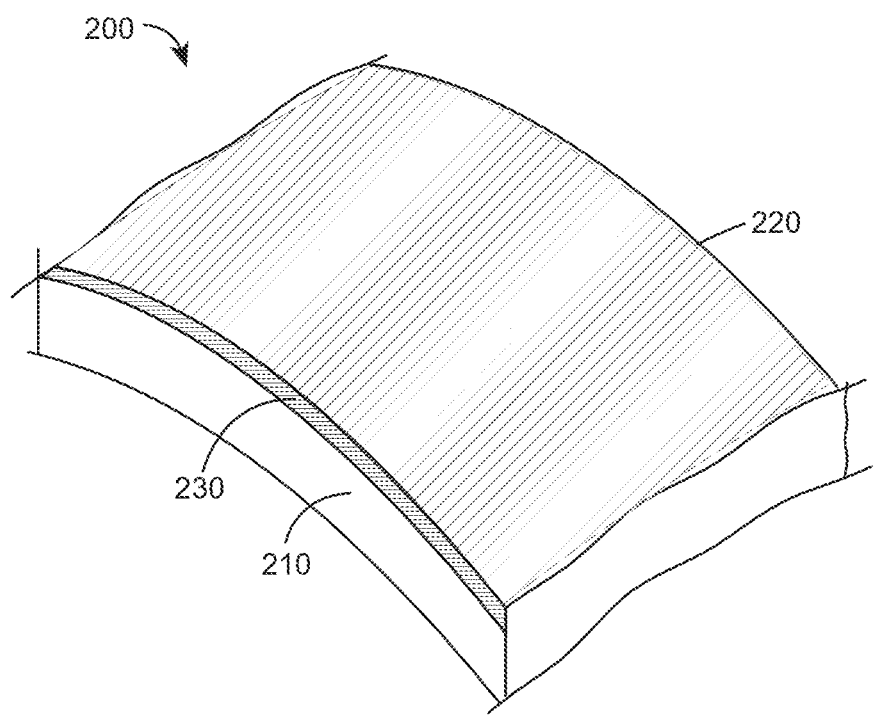
FIG. 6B is the view of the structure illustrated in FIG. 6A, with its covering layer being shown as transparent for the purpose of illustration.
Figure 6D:
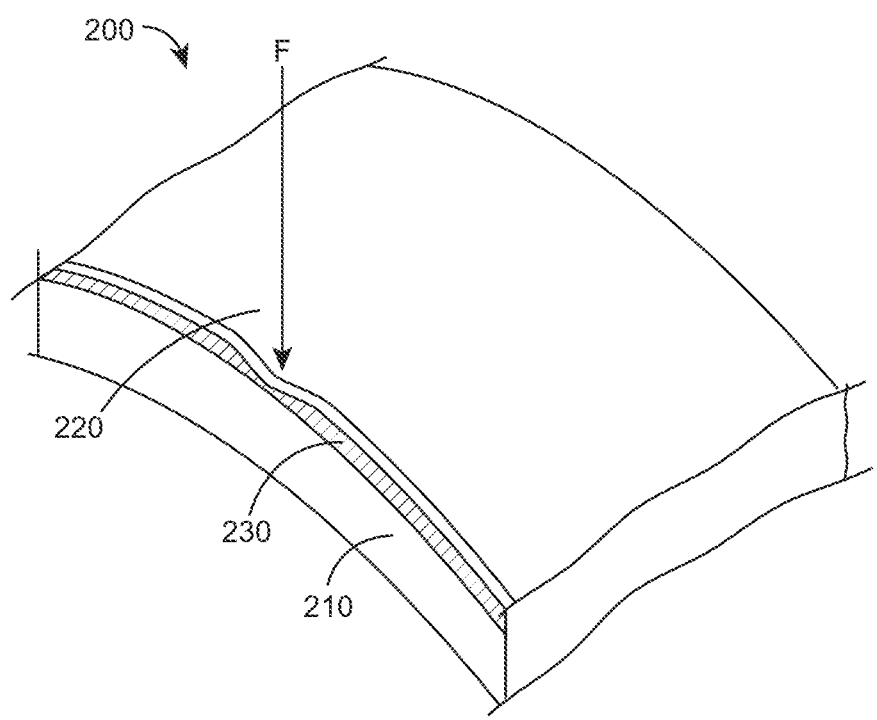
FIG. 6D is the view illustrated in FIG. 6A, showing the structure in operation.

The covering layer 220 and the elastic layer are configured so that the covering layer flexes inwardly into the elastic layer 230 when a force F is applied on the external surface 224 of the covering layer 220. Thus, the suspension characteristics are achieved and the covering layer 220 provides a feeling of softness to the article like that of elastic foam. In other words, the covering layer and the elastic layer are configured so that an area of the covering layer 120 to which the force F is applied behaves like a membrane held in place by adjacent areas of the covering layer where the force is not applied, with both the external surface 124 as well as the internal surface 122 of the covering layer 120 at these areas flexing inwardly into the elastic layer, as shown in FIG. 6D. Thus, when the force F is applied at the external surface 124 of the covering layer 120, and the covering layer 120 flexes into the gaps G, the volume of the elastic layer under said areas is reduced. Thus, the covering layer 220 is capable of flexing upon application of force only when mounted so as to have reducible volume underneath.

Materials from which the core member 210, the covering layer 220, and the elastic layer 230 can be made are described at the end of the present description.

In the articles 1, 100 and 200 described above as well as any other article according to different aspects of the presently disclosed subject matter, the core member and the covering layer can be mechanically connected to each other by means, some examples of which are presented below. It is to be understood herein that where the connection means are described below with reference to the article 1 only, for the sake of simplicity, these apply to any article according to the presently disclosed subject matter.

Figure 7:
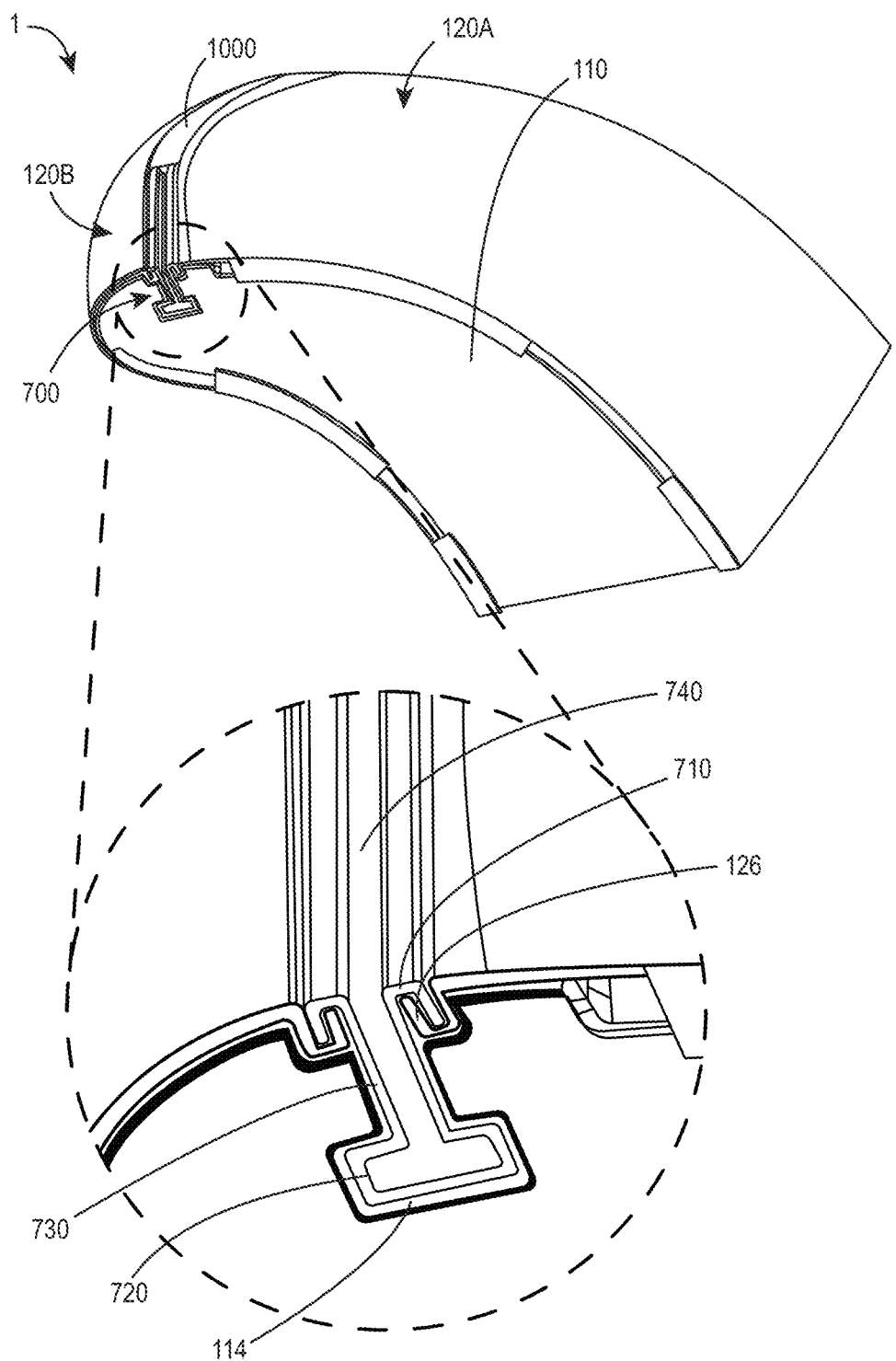
FIG. 7 schematically illustrates an example of a connection between a covering layer and a core member, which can be used in a structure according to the subject matter of the present application.

FIG. 7 illustrates a hybrid structure constituting a portion of an article 1 with a pop-out showing an enlarged view of a connection between a portion of periphery of the first part 120A of the covering layer 120, a portion of the periphery of the second part 120B of covering layer 120, and the core member 110 by a connection member 700 according to one specific embodiment of the presently disclosed subject matter. As shown in the enlarged view, the peripheries of the first part and second part of the covering layer are bent to form respective flanges 126. The connection member 700 includes two lip portions 710, each configured to engage with and grip the respective flange 126. The lip portions 710 extend towards a broad bottom portion 720 of the connection member 700. The broad bottom portion 720 is configured to be inserted into a corresponding groove 114 formed in the core member 110. The broad bottom portion 720 and the extensions from the lip portions 710 form a narrower neck-like portion 730 preventing the extraction of the bottom portion 720 from the groove 114. The engagement of the flanges 126, lip portions 710, bottom portion 720, and groove 114 secures the two covering layer parts 120A and 120B with the core member 110. A recess 740 is formed between the extensions of the lip portions 710 and extends into the bottom portion 720. The recess 740 is configured to receive therein external components to be connected to the article or to the final product. The external component can be a decorative component like metallic plate 1000, or can be a male part of an external connector, like a zipper, thereby allowing the article to be connected to any external product. The connection member 700 can be made of same material as that of the core member or the covering layer of the article 1.

Figure 8:
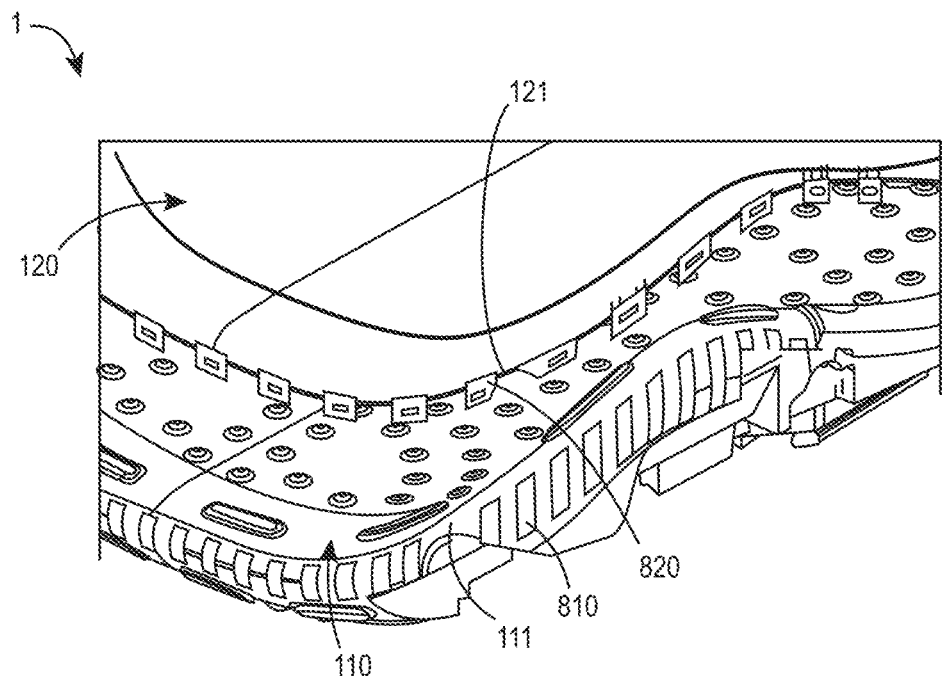
FIG. 8 schematically illustrates another example of a connection between a covering layer and a core member, which can be used in a structure in accordance with the subject matter of the present application.

FIG. 8 illustrates an exploded view of a portion of a seat incorporating the article 1. FIG. 8 shows a portion of a periphery 111 of the core member 110 comprising a plurality of male portions 810 of a quick-connection fitting arrangement. FIG. 8 further shows a portion of a periphery 121 of the covering layer 120 comprising a plurality of female portions 820, corresponding to the male portions 810, of the quick-connection fitting arrangement. During assembly of the article, the covering layer 120 is mounted to the core member 110, the male portions 810 and female portions 820 mechanically connect to each other by a quick fitting engagement, such as a snap fit connection, thereby securely connecting the core member 110 with the covering layer 120. In some examples, the covering layer can comprise the male portions and the core member can comprise the female portions.

The snap-fitting connection means described above are arranged at one or more portions of peripheries of the core member and of the covering layer, however, it is to be understood that the connection means can also be arranged along the entire periphery as well.

At least some of snap-fitting connection means can be arranged at areas of the covering layer and the core member remote from the peripheries, including central areas thereof. The snap-fitting connection means can comprise connection elements, e.g. such as locking recesses constituting female portions of the connection means formed in one of the core member and the covering layer, and corresponding connecting elements e.g. such as lockable protrusions constituting male portions of the connected means protruding towards the female portions from the other one of the core member and the covering layer. For example, the male portions can be mounted integrally to, or constitute a unitary body with, the covering layer and the female portions can be integrally formed in, or constitute a unitary body with, the core member.

In any of the above examples, the covering layer can be connected to the core member by a suspension-allowing connection arrangement. This arrangement can comprise female and male portions of the kind described above, which can have such configuration and dimensions as to allow movement of the latter portions within the former portions in the thickness direction of the structure and, optionally, also in a tangential direction perpendicular to the thickness direction. This can allow the covering layer to flex in the thickness direction as described above, and to also be slightly moved relative to the core member in the tangential direction, when respective flexing and tangential forces are at least indirectly applied to areas of the covering layer associated with the male portions, resulting in an added dimension to the suspension characteristics of the covering layer, and thus, an improved feeling of softness to the article. Examples of such connection arrangement in articles having the same components and features as articles 1, 100 and 200 described above, will now be described below with reference to FIGS. 9A-11B. Thus, in these examples, only those features of the articles will be described which are needed for the description of structure and operation of the connection arrangement.

Figure 9A:
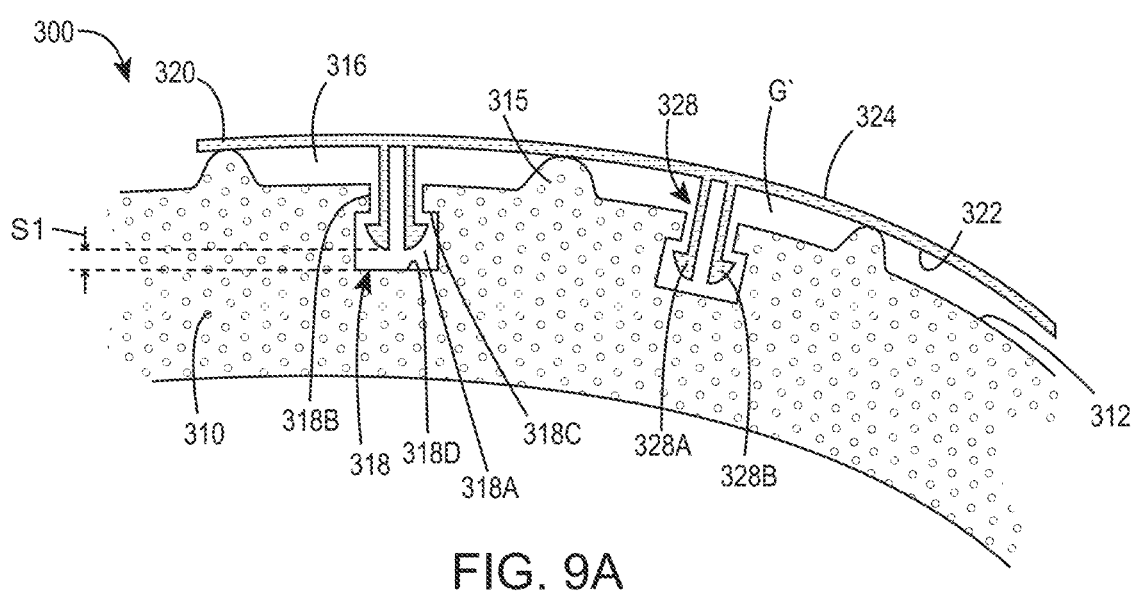
FIGS. 9A and 9B illustrate a sectional view of a structure according to a still further example of the subject matter of the present application, in different states.
Figure 9B:
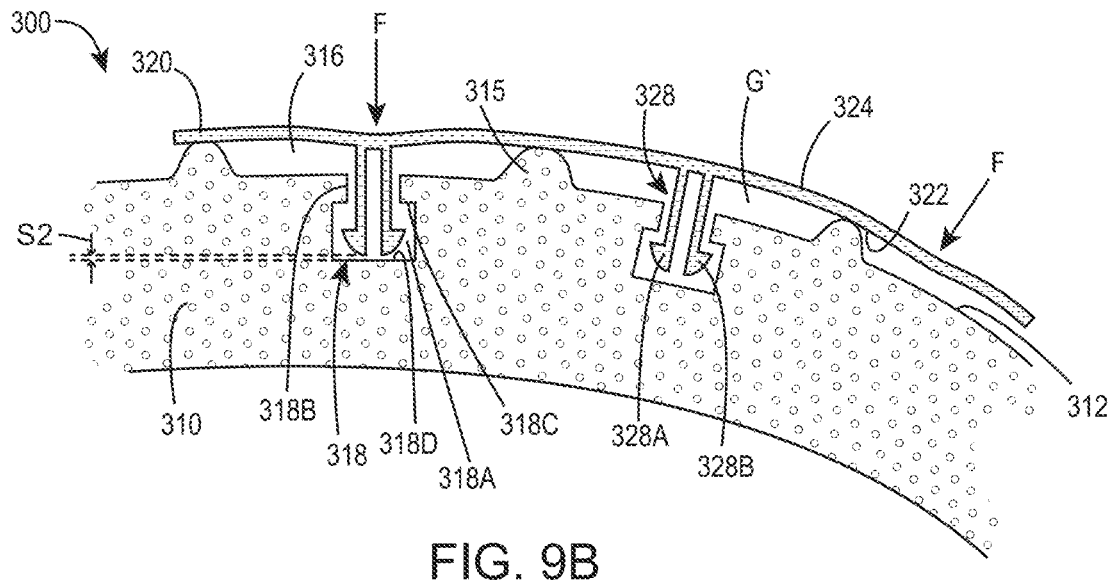

FIGS. 9A and 9B illustrate a sectional view of a hybrid structure constituting a portion of an article 300 having all the components and features of the article 100 described above with reference to FIGS. 1A-3, and additionally having snap-fitting connection means.

More particularly, the article 300 has a core member 310 and a covering layer 320 both having the same basic configuration, made of the same materials (described at the end of the present description) and operating in the same manner as the respective covering layer and the core member of the article 100 shown in FIGS. 1A to 3. The core member 310 has an outer surface 312 facing in the direction of the covering layer 320. The core member 310 has a plurality of bumps 315 protruding from the outer surface 312 in the direction of the covering layer 320 and spaced from each other by spacing regions 316 between any two adjacent bumps 315, so that when the covering layer rests on the core member a plurality of gaps G is formed between the spacing regions and the associated areas of the covering layer overlying the spacing regions. The covering layer 320 has an internal surface 322 facing in the direction of the core member 310 and an external surface 324 facing towards the exterior of the article 300.

The snap-fitting connection means of the article 300 comprise a plurality of female portions 318 extending inwardly into the core member 310 from the outer surface thereof at some of the spacing regions 316, and a plurality of male portions 328 protruding from the internal surface of the covering layer at areas thereof overlying these spacing regions and configured to be lockingly received in the respective female portions 318. In other words, each pair of male and female portions is associated with one of the gaps G.

Each female portion has a broad bottom portion 318A, a narrow top portion 318B, and a shoulder 318C joining the broad portion 318A and narrow portion 318B. Each male portion 328 has at least two leaf portions 328A and 328B at an end thereof distal from the internal surface 322. The male portions 328 are flexible and their leaf portions are configured to be pressed towards each other when passing through the narrow top portion 318B of the female portion 318, and to return to their original position when entering its broad bottom portion 318A, whereby each male portion becomes held within the female portion 318 and locked at the shoulder 318C so as to prevent the extraction of the male portion 328 from the female portion 318 and fixedly attach the covering layer 320 to the core member 310.

The covering layer 320, when attached to the core member 310, covers the outer surface 312 of the core member 310 such that, as seen in FIG. 9A, the internal surface 322 of the covering layer 320 rests on the bumps 315 and the male portions 328 are locked inside the female portions 318.

As further seen in FIGS. 9A and 9B, the dimensions and configurations of the female and male portions are such that, when the leaf portions 328A and 328B are locked at the shoulder 318C in a normal state of the corresponding area of the covering layer 320, a space S1 is left between a bottom surface 318D of the female portion 318 and a distal end of the male portion 328, thereby allowing the male portion 328, while staying locked in the female portion 318, to move towards the bottom surface 318D of the female portion 318 when the corresponding area of the covering layer 320 is flexed into the associated gap G under the application of the flexing force threat, thereby reducing the space S1 to S2, as shown in FIG. 9B. Furthermore, as can be seen in FIGS. 9A and 9B, the dimensions and configurations of the female and male portions are such that the male portion 328 when inserted into the female portion 318 is spaced by a distance D from sidewalls of the female portion 318, thereby allowing the male portion to move relative to the female portion in the tangential direction when the tangential force, is applied at least indirectly to the covering layer at or adjacent the above areas. Thus, the covering layer 320, while being securely attached to the core member, is allowed to flex inwardly towards the core member 310 together with its male portions, at its areas associated with the male portions, and to be slightly moved relative to the core member in the tangential direction when the tangential force is at least indirectly applied to these areas.

Figure 10A:
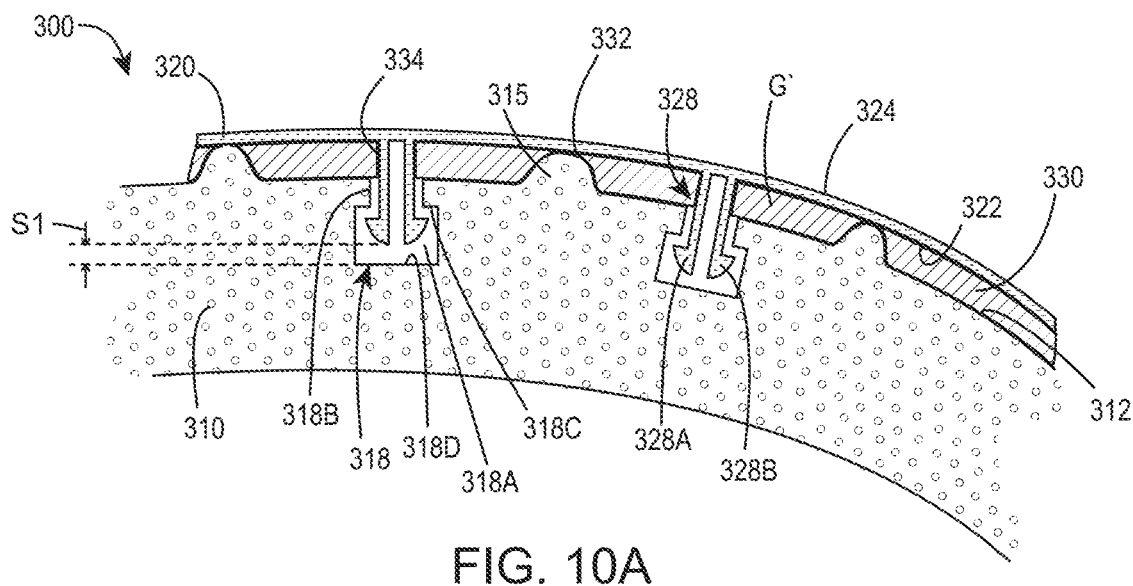
FIGS. 10A and 10B illustrate a sectional view of a structure according to a still further example of the subject matter of the present application, in different states.
Figure 10B:
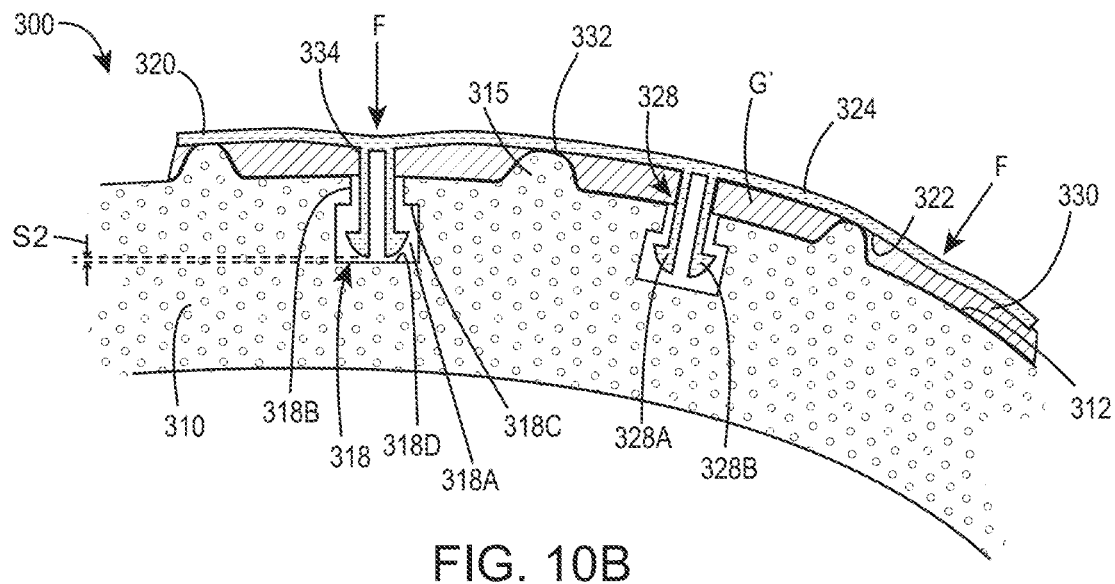

FIGS. 10A and 10B illustrate a hybrid structure constituting a portion of article 300 having all components and features described above with respect to the structure shown in FIGS. 4A-4D, and snap-fitting connection means which are the same as those described above with respect to FIGS. 9A and 9B and which additionally include holes in the elastic layer allowing the use of the connection means.

Thus, the structure shown in FIGS. 10A and 10B comprises the core member 310, the covering layer 320, and an elastic layer 330 disposed therebetween such that the elastic layer 330 fills in at least a part of the reducible volume defined by gaps G' between the core member 310 and the covering layer 320, which all can have the same basic configuration, are made of the same materials (described at the end of the present description) and operate in the same manner as the respective covering layer, core member and elastic layer of the article 100 shown in FIGS. 4A to 4D.

The elastic layer 330 includes a first plurality of holes 332 corresponding in shape and dimensions to the bumps 315 such that, when the article is assembled, the bumps 315 protrude from the outer surface 312 of the core member 310 through the corresponding holes 332 allowing the covering layer 320 to rest on at least some of the bumps 315. The elastic layer 330 further includes a second plurality of holes 334 provided at positions corresponding to the positions of the female portions 318 and the male portions 328 of the core member 310 and covering layer 320, respectively, associated with some of the gaps G'. The second plurality of holes 334 allow the male portions 328, and particularly their broad bottom portions, to pass therethrough into the female portions 318, when the article is assembled, to get locked in the corresponding female portions 318, with the ability to move in the thickness direction within a range S1-S2, and in the tangential direction within the distance D. The covering layer 320 is thus fixedly attached to the core member 310 via the elastic layer sandwiched therebetween, while functioning as described above with reference to FIGS. 9A and 9B, under the application of flexing and tangential forces to the covering layer.

Figure 11A:
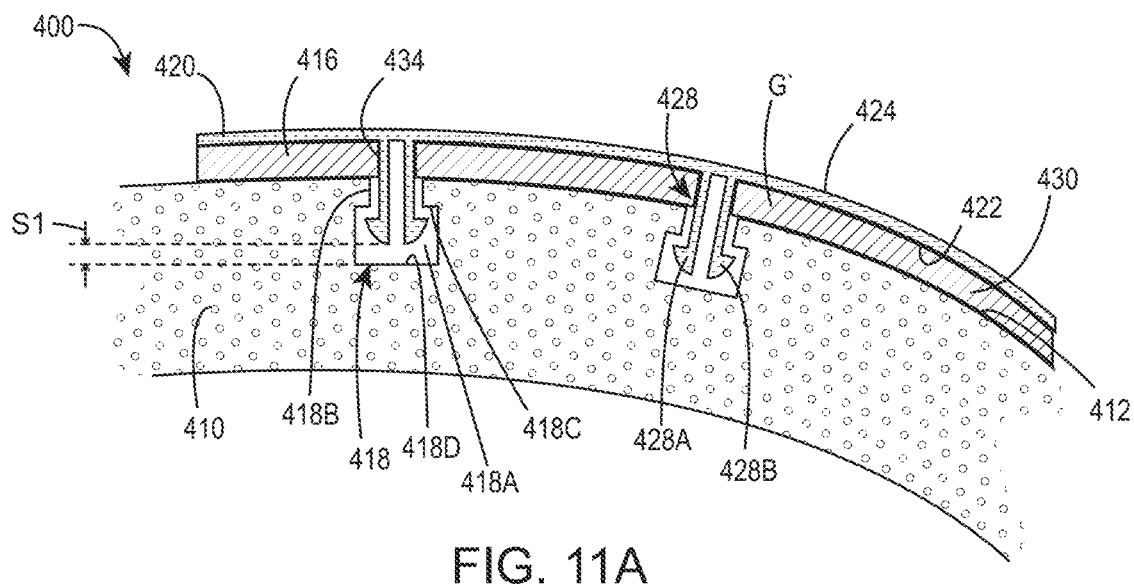
FIGS. 11A and 11B illustrate a sectional view of a structure according to a still further example of the subject matter of the present application, in different states.
Figure 11B:
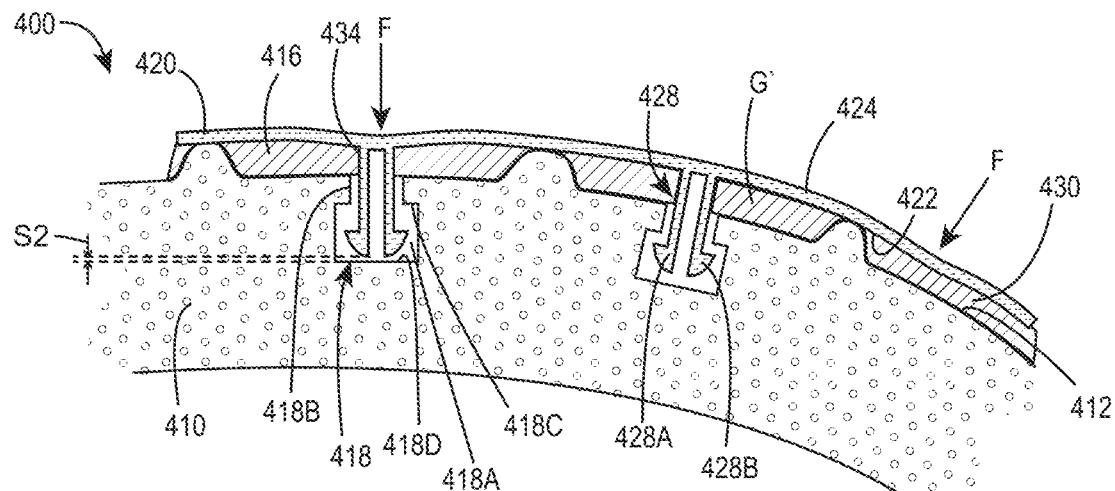

FIGS. 11A and 11B illustrate a sectional view of a hybrid structure constituting a portion of an article 400 having all the components and features of the article 200 described above with reference to FIGS. 6A-6D and having snap-fitting connection means which are the same as those described above with respect to FIGS. 10A and 10B.

More particularly, the article 400 includes a core member 410, a covering layer 420 and an elastic layer 430 which all can have the same basic configuration, are made of the same materials (described at the end of the present description) and operate in the same manner as the respective covering layer, core member and elastic layer of the article 200 illustrated in FIGS. 6A to 6D.

The core member 410 includes an outer surface 412 facing an exterior of the article. The covering layer 420 has an internal surface 422 and an opposite external surface 424. The elastic layer 430 is located between the core member 410 and the covering layer 420 such that, when the article is assembled, the elastic layer 430 rests on the outer surface 412 of the core member 410 and the internal surface 422 of the covering layer 420 rests on the elastic layer 430.

The snap-fitting connection means comprise a plurality of female portions 418 in the outer surface of the core member 410, each of which includes a broad bottom portion 418A, a narrow top portion 418B, and a shoulder 418C joining the broad portion 418A and narrow portion 418B, and a corresponding plurality of male portions 428 protruding from the internal surface 422 of the covering layer 420 towards the core member 410, each including at least two leaf portions 428A and 428B at an end thereof distal from the internal surface 422. The leaf portions 428A and 428B are configured to be held within the female portion 418 and be locked at the shoulder 418C so as to prevent the extraction of the male portion 428 from the female portion 418, whereby the covering layer 420 is fixedly attach to the core member 410.

The elastic layer 430 includes a plurality of holes 434 provided at positions corresponding to the positions of the female portions 418 and the male portions 428. Each hole 434 allows the broad bottom portion 418A of the male portions 428 to pass therethrough when the article is assembled, for the male portion to be received within the corresponding female portion and get locked therein, with the ability to move in the thickness direction within the range S1'-S2', and in the tangential direction within the distance D'. The covering layer 420 is thus fixedly attached to the core member 410 via the elastic layer sandwiched therebetween, while functioning as described above with reference to FIGS. 9A and 9B, under the application of flexing and tangential forces to the covering layer.

In the articles illustrated in FIGS. 10A, 10B and 11A, 11B, in which the elastic layer comprises holes via which the male portions pass into the corresponding female portions, these holes can have a cross-section corresponding to that of the narrow top portions of the male portions, the holes being elastically radially extendable during such passage.

Figure 12:
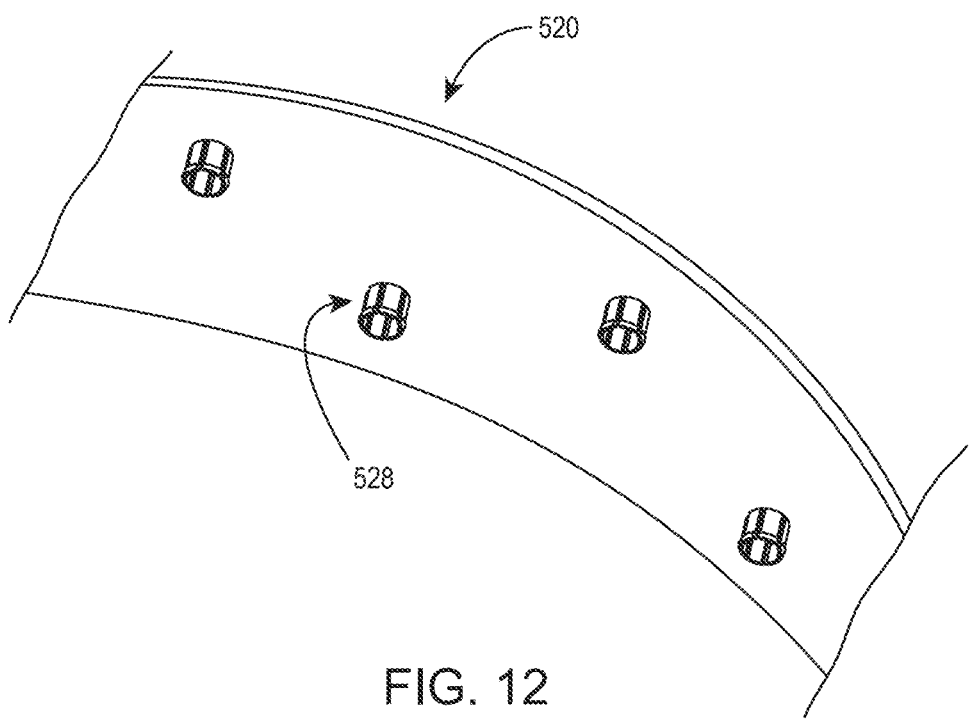
FIG. 12 illustrates one example of a covering layer that can be used in any structure according to the subject matter of the present application, the covering layer being shown in its bottom perspective view.

Whilst in FIGS. 9A-11B, the snap-fitting connection means are shown so that only two snap-fit elements are seen in each male portion (since these FIGURES are cross-sectional views), the male portions can each comprise any desired number of snap-fit elements. FIG. 12 illustrates one example of male portions 528 having a cross-sectional view as shown in FIGS. 9A-11B, in a covering layer 520 which can be identical to the covering layers 320 and 420 shown in FIGS. 9A-11B. FIG. 12 shows one selected region of the covering layer 520 in a perspective bottom view. The male portions 528 are formed unitarily with the covering layer 520, are distributed uniformly at least along the region shown in FIG. 12 and are configured to be received within corresponding female portions formed in any of the core members of FIGS. 9A-11B. In this example, each male portion 520 is of an annular type and comprises six snap-fit elements each constituting a sector of a cylinder and having a leaf portion radially protruding therefrom in the same manner as the leaf portions 328A, 328B and 428A, 428B of the respective male portions 328, 428 of the snap-fitting connection means shown in FIGS. 9A-11B.

Although all the illustrated examples, in which bumps are formed on the outer surface of the core member, have been described herein above with the covering layer being configured to flex upon application of the flexing force, it is to be understood herein that in all such examples, the core member and/or the bumps can be compressible as well. More particularly, in all such examples, with the bumps protruding from the core member, the core member, the bumps, or both of them, can have compressibility higher than that of the covering layer, so that when the flexing force is applied on the covering layer at areas overlying such bumps, the bumps are compressed thereby adding to the suspension features of the hybrid structure, especially at the areas corresponding to the bumps.

Alternatively, or in addition, in case when the core member has compressibility higher than that of the covering layer, the covering layer can be formed with bumps protruding therefrom towards the core member and configured to compress the latter when the flexing force is applied on the covering layer at areas overlying such bumps thereby adding to the suspension features of the hybrid structure, especially at the areas corresponding to the bumps.

Figure 13A:
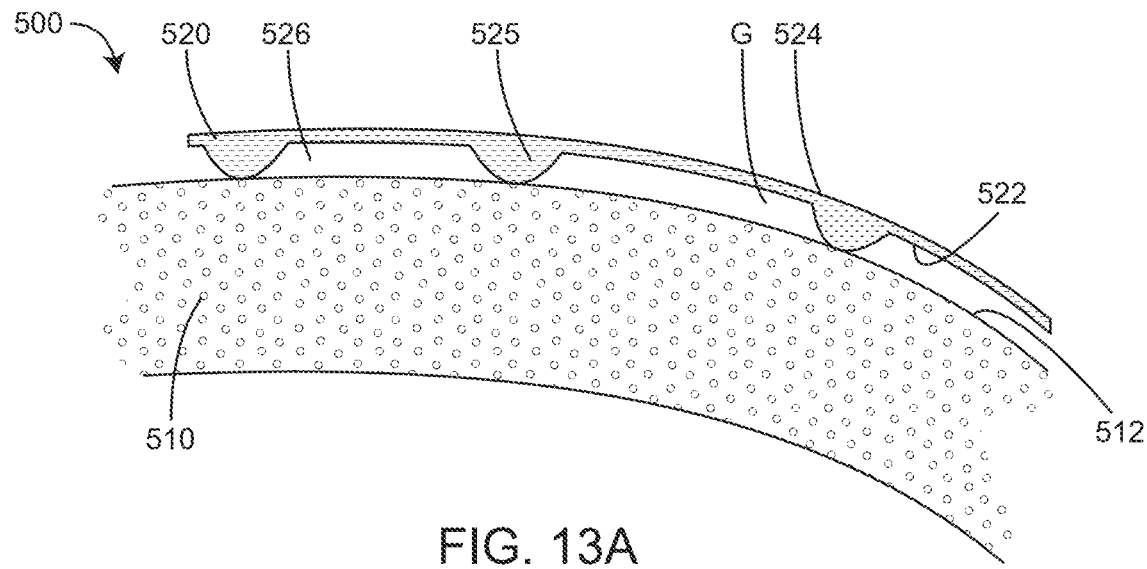
FIGS. 13A and 13B illustrate a sectional view of a structure according to a still further example of the subject matter of the present application, in different states.
Figure 13B:
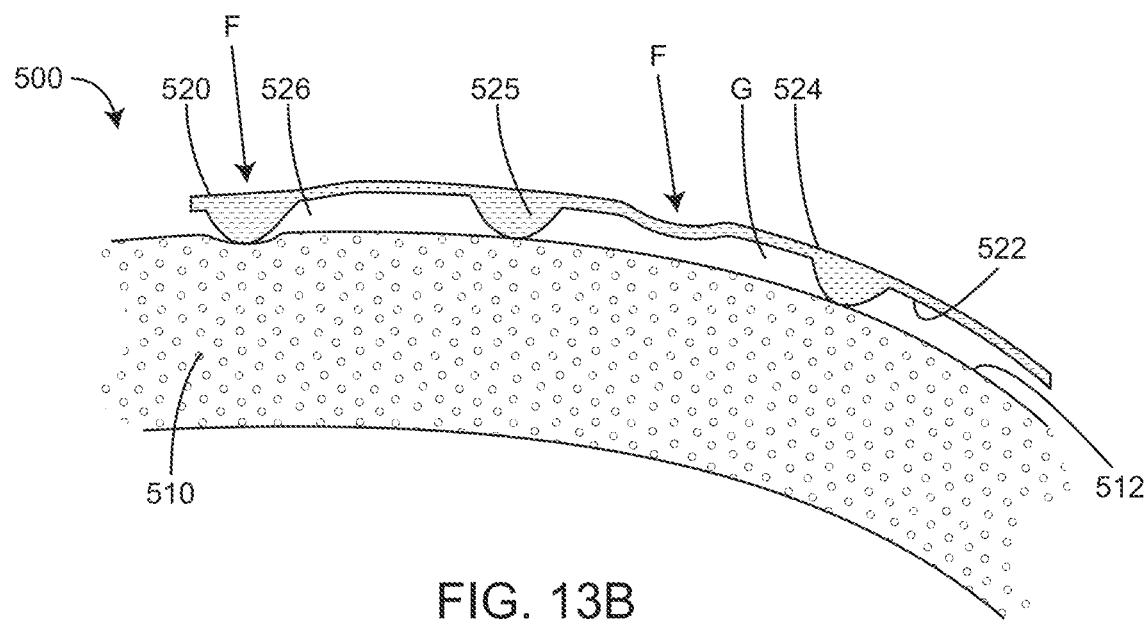

FIGS. 13A and 13B illustrate a sectional view of a hybrid structure constituting a portion of an article 500 having all the components and features of the article 100 described above with reference to FIGS. 1A-3, with the only difference being that in the article 500, the bumps protrude from the covering layer instead of the core member as in the article 100.

More particularly, the article 500 has a core member 510 and a covering layer 520 both having the same basic configuration, made of the same materials (described at the end of the present description) and operating in the same manner as the respective covering layer and the core member of the article 100 shown in FIGS. 1A to 3. The core member 510 has an outer surface 512 facing in the direction of the covering layer 520. The covering layer 520 has a plurality of bumps 525 protruding from an internal surface 522 in the direction of the core member 510 and spaced from each other by spacing regions 526 between any two adjacent bumps 525, so that when the covering layer 520 is connected to the core member 510 with the bumps 525 resting on an outer surface 512 of the core member 510, a plurality of gaps G is formed between the spacing regions and the associated areas of the outer surface 512 underlying the spacing regions. The height of the bumps 525 define the height of the gaps and the covering layer 520 has a thickness at regions between the bumps 525, which is less than the height of the bumps 525. According to the illustrated embodiment, the bumps are unitarily formed with the covering layer 520. However, in another embodiment (not shown), the bumps can be separately manufactured, and then assembled together with the covering layer.

As also described above with respect to the covering layer 120 and gaps G of article 100, the covering layer 520 and the gaps G of the article 500 are so configured, i.e. the covering layer 520 is made of such material and has such a thickness, and gaps G have such dimensions that, when a flexing force F is applied at an external surface 524 of the covering layer 520 at areas above the gaps G, the covering layer 520 slightly flexes inwardly into the gaps G, as best seen in FIG. 13B, and when the force F is removed, it flexes back to its normal shape.

In addition to the above described flexing, the core member 510 has compressibility higher than that of the covering layer, and areas of the outer surface 512 of the core member 510 underlying the bumps 525 are compressed when the flexing force F is applied on external surface 524 of the covering layer 520 at areas corresponding to the bumps 525, as shown in FIG. 13B and returns to the original shape when the force is removed.

Whilst the bumps 525 are formed on the covering layer 520 instead of the core member (as is the case in the article 100), the description about the structure, dimensions, positioning of the bumps according to different examples of the article 100 applies to the bumps 525 as well and has not been repeated herein for the sake of conciseness. Also, in a similar manner as described for the covering layer 120, the covering layer 520 while flexing maintains its thickness at the areas where flexing force F is applied and the internal and the outer surface of the covering layer 520 flexes equally into the gaps G.

Thus, in the article 500, suspension quality and the feeling of softness is achieved by the flexing of the covering layer as well as by compression of the core member at areas underlying the bumps. It is to be understood herein that the core member has a compressibility higher than that of the covering layer, but still lesser than that an elastic foam generally has. More particularly, the core member can be much lesser compressible if a force is applied over a large area thereof, and the compressibility of the core member is localized to the areas underlying the bumps. The dimensions of the bumps and the spacing regions, in a direction along the outer surface of the core member, effect the compressibility of the core member. For instance, the narrower the bumps are, higher is the compressibility of the core member at the areas underlying such bumps, as well as farther the bumps are from each other, higher is the compressibility of the core member at the areas underlying such bumps.

Figure 14A:
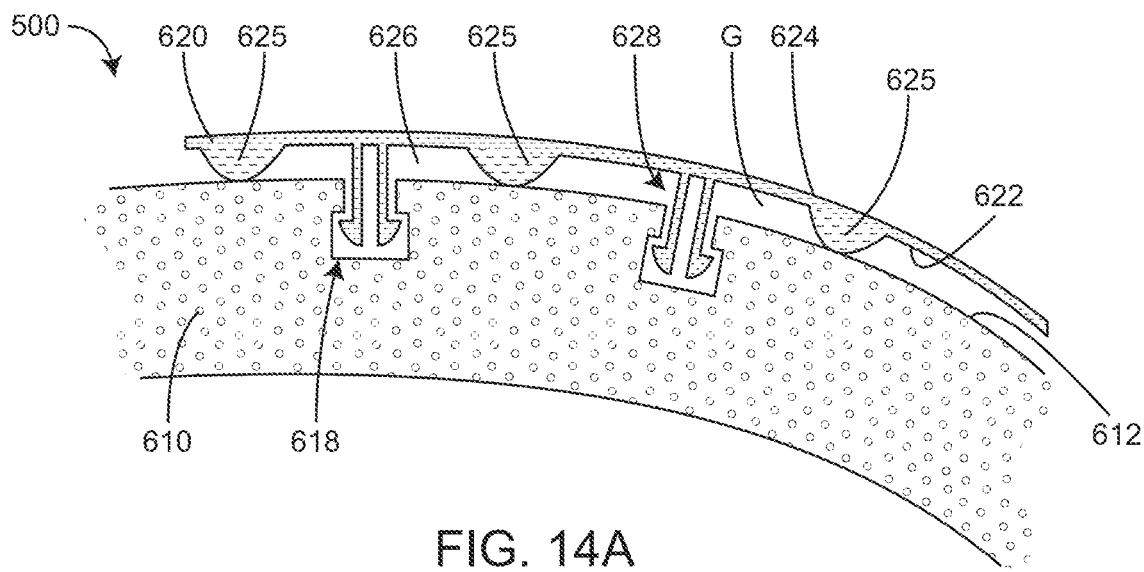
FIGS. 14A and 14B illustrate a sectional view of a structure according to a still further example of the subject matter of the present application, being the structure illustrated in FIGS. 13A and 13B with additional connection means.
Figure 14B:
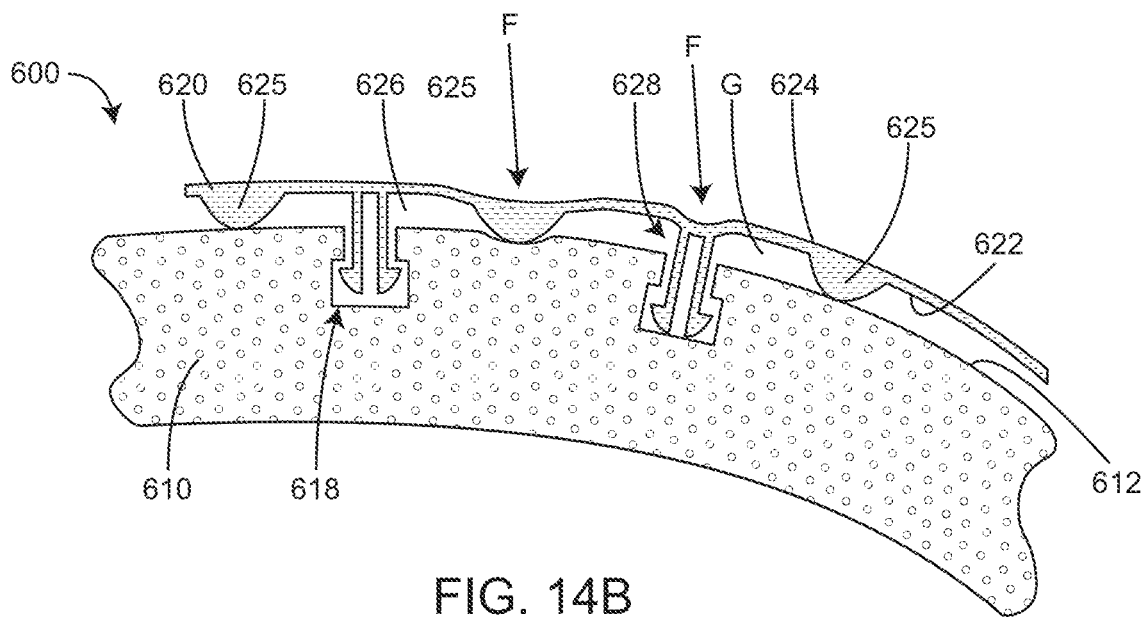

FIGS. 14A and 14B illustrate a sectional view of a hybrid structure constituting a portion of an article 600 having all the components and features of the article 500 described above with reference to FIGS. 13A-13B, and additionally having snap-fitting connection means.

More particularly, the article 600 has a core member 610 and a covering layer 620 both having the same basic configuration, made of the same materials (described at the end of the present description) and operating in the same manner as the respective covering layer and the core member of the article 500 shown in FIGS. 13A and 13B. The core member 610 has an outer surface 612 facing in the direction of the covering layer 620. The covering layer 620 has a plurality of bumps 625 protruding from an internal surface 622 in the direction of the core member 610 and spaced from each other by spacing regions 626 between any two adjacent bumps 625, so that when the covering layer is connected to the core member, the bumps 625 rest on the outer surface 612 of the core member 610, and a plurality of gaps G is formed between the spacing regions and the associated areas of the core member underlying the spacing regions.

The snap-fitting connection means of the article 600 are same in structure and operation to that of the snap-fitting connection means of article 300 as described above with reference to FIGS. 9A and 9B. More particularly, the snap-fitting connection means of the article 600 comprise a plurality of female portions 618 extending inwardly into the core member 610 from the outer surface thereof at areas of the core member underlying some of the spacing regions 626, and a plurality of male portions 628 protruding from the internal surface 622 of the covering layer 620 at areas corresponding to the spacing regions and configured to be lockingly received in the respective female portions 618. In other words, each pair of male and female portions is associated with one of the gaps G.

The snap fitting connection means of the article 600 are suspension-allowing connection means in the same manner as are the snap fitting connections means of the article 300. For instance, the dimensions and configurations of the female portions 618 and male portions 628 are such that upon connection of the covering layer with the core member, when the flexing force F is applied on the outer surface 624 of the covering layer 620 at areas corresponding to the male portions 628, the male portions 628 move within the female portions 618 as described above with reference to article 300, thereby providing the suspension at the areas corresponding to the connection means, in addition to the suspension provided by the flexing of the covering layer at areas corresponding to the spacing regions and by compression of the core member at areas corresponding to the bumps as described above with reference to article 500. Thus, the covering layer 620, while being securely attached to the core member, is allowed to flex inwardly towards the core member 610 together with its male portions, at its areas associated with the male portions, and to be slightly moved relative to the core member in the tangential direction when the tangential force is at least indirectly applied to these areas, in the same manner as described above with reference to article 300.

Figure 15:
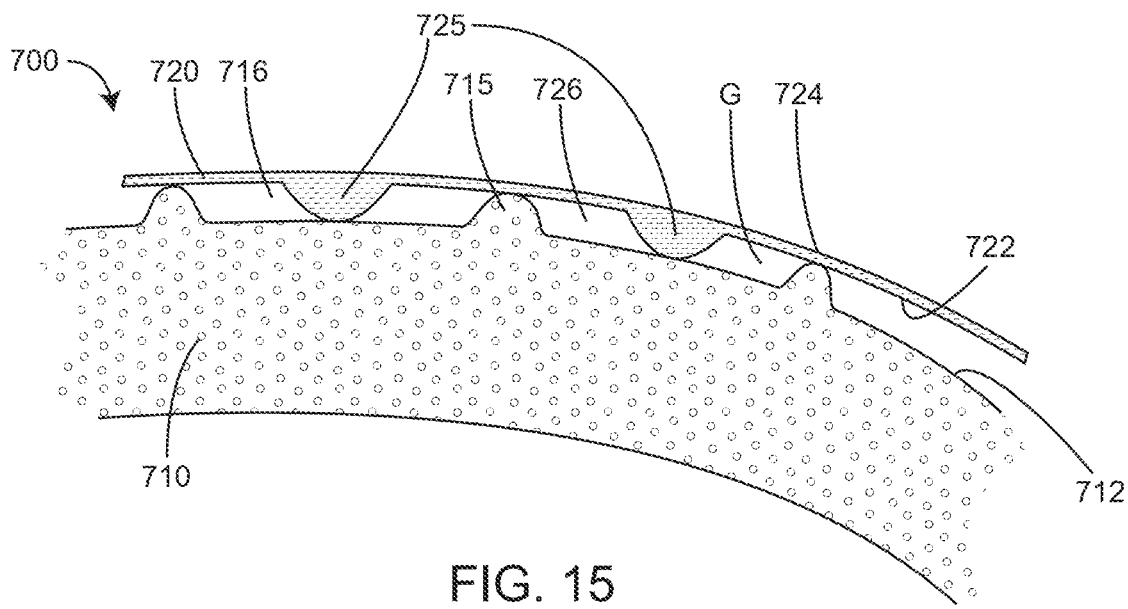
FIG. 15 illustrates a sectional view of a structure according to a still further example of the subject matter of the present application.

FIG. 15 illustrate a sectional view of a hybrid structure constituting a portion of an article 700 having all the components and features of the article 500 described above with reference to FIGS. 13A and 13B, and additionally having a plurality of bumps protruding from the core member.

More particularly, the article 700 has a core member 710 and a covering layer 720 both having the same basic configuration, made of the same materials (described at the end of the present description) and operating in the same manner as the respective covering layer and the core member of the article 500 shown in FIGS. 13A and 13B. The core member 710 has an outer surface 712 facing in the direction of the covering layer 720. The covering layer 720 has an internal surface 722 facing the core member 710, and having a plurality of bumps 725 protruding therefrom in the direction of the core member 710 and spaced from each other by spacing regions 726 between any two adjacent bumps 725. The core member 710 has a plurality of bumps 715 protruding from the outer surface 712 of the core member 710 in the direction of the covering layer 720 and spaced from each other by spacing regions 716 between any two adjacent bumps 715. In the illustrated example, the bumps 715 and 725 have dimensions in the direction extending from the core member to the covering layer such that when the covering layer 720 is connected to the core member 710, the internal surface 722 of the covering layer 720 rests on the bumps 715 protruding from the core member 710, and the bumps 725 protruding from the covering layer 720 rest on the outer surface 712 of the core member 710, and a plurality of gaps G is formed between the spacing regions 726 and the associated areas of the outer surface 712 of the core member 710 underlying the spacing regions 726, and between the spacing regions 716 the associated areas of the internal surface 722 of the covering layer 720 overlying the spacing regions 716.

In some examples (not shown), the dimensions of the bumps 715 and 725 can be such that either the covering layer 720 rests on the bumps 715 and a space remains between the bumps 725 and the core member 710, or the bumps 725 rest on the core member 710 and a space remains between the covering layer 720 and the bumps 715.

The bumps 715 and the bumps 725 can be distributed along the corresponding surfaces of the core member and the covering layer in any pattern, uniform or non-uniform, or similar to the ones described above with respect to the article 100, and such that none of the bumps 715 coincide with any of the bumps 725. In other words, each of the bumps 715 and 725 are so arranged on the corresponding surfaces of the core member and the covering layer so as to align with spacing regions between the other of the bumps.

As also described above with respect to the covering layer 520 and gaps G of article 500, the covering layer 720 and the gaps G of the article 700 are so configured, i.e. the covering layer 720 is made of such material and has such a thickness, and gaps G have such dimensions that, when a flexing force F is applied at an external surface 724 of the covering layer 720 at areas above the gaps G, the covering layer 720 slightly flexes inwardly into the gaps G, and when the force F is removed, it flexes back to its normal shape.

In addition to the above described flexing, the core member 710 has compressibility higher than that of the covering layer, and areas of the outer surface 712 of the core member 710 underlying the bumps 725 are compressed when the flexing force F is applied on external surface 724 of the covering layer 720 at areas corresponding to the bumps 725 and return to the original shape when the force is removed.

Further additionally, the bumps 715 protruding from the core member 710 are compressible in such a manner that when the flexing force F is applied on external surface 724 of the covering layer 720 at areas corresponding to the bumps 715, the bumps 715 are elastically compressed by that force.

Thus, in the article 700, suspension quality and the feeling of softness is achieved by the flexing of the covering layer, by compression of the core member at areas underlying the bumps 725, and by compression of the bumps 715. It is to be understood herein that the core member and/or bumps 715 have a compressibility higher than that of the covering layer, but still lesser than that an elastic foam generally has.

It is to be understood herein that the description about the structure, dimensions, positioning of the bumps according to different examples of the article 100 applies to the bumps 715 and 725 as well and has not been repeated herein for the sake of conciseness. Also, in a similar manner as described for the covering layer 120, the covering layer 720 while flexing maintains its thickness at the areas where flexing force F is applied and the internal and the outer surface of the covering layer 720 flexes equally into the gaps G.

Figure 16:
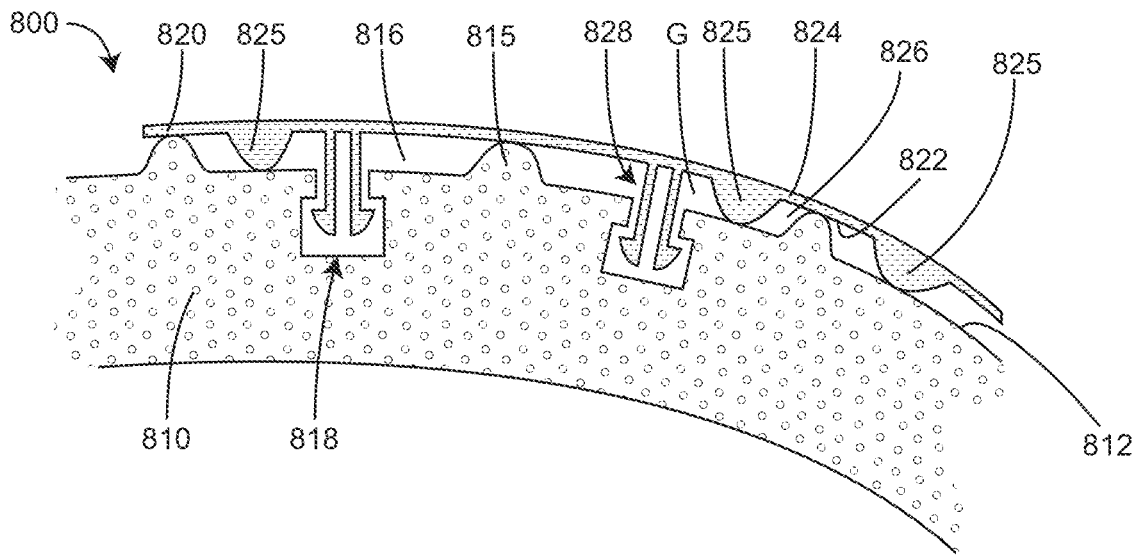
FIG. 16 illustrate a sectional view of a structure according to a still further example of the subject matter of the present application, being the structure illustrated in FIG. 15 with additional connection means.

FIG. 16 illustrate a sectional view of a hybrid structure constituting a portion of an article 800 having all the components and features of the article 700 described above with reference to FIG. 15, and additionally having snap-fitting connection means.

More particularly, the article 800 has a core member 810 and a covering layer 820 both having the same basic configuration, made of the same materials (described at the end of the present description) and operating in the same manner as the respective covering layer and the core member of the article 700 shown in FIG. 15. The core member 810 has an outer surface 812 facing in the direction of the covering layer 820 and having a plurality of bumps 815 protruding therefrom and spaced from each other by spacing regions 816. The covering layer 820 has an internal surface facing in a direction of the core member 810 and having a plurality of bumps 825 protruding therefrom and spaced from each other by spacing regions 826. When the covering layer is connected to the core member, the bumps 825 rest on the outer surface 812 of the core member 810 and the internal surface of the covering layer rests on the bumps 815.

The snap-fitting connection means of the article 800 are same in structure and operation to that of the snap-fitting connection means of article 300 as described above with reference to FIGS. 9A and 9B. More particularly, the snap-fitting connection means of the article 800 comprise a plurality of female portions 818 extending inwardly into the core member 810 from the outer surface thereof at areas of the core member corresponding to some of the spacing regions 816, and a plurality of male portions 828 protruding from the internal surface 822 of the covering layer 820 at areas corresponding to some of the spacing regions 826 and configured to be lockingly received in the respective female portions 818.

The snap fitting connection means of the article 800 are suspension-allowing connection means in the same manner as are the snap fitting connections means of the articles 300 and 600. For instance, the dimensions and configurations of the female portions 818 and male portions 828 are such that upon connection of the covering layer with the core member, when the flexing force F is applied on the outer surface 824 of the covering layer 820 at areas corresponding to the male portions 828, the male portions 828 move within the female portions 818 as described above with reference to article 300, thereby providing the suspension at the areas corresponding to the connection means, in addition to the suspension provided by the flexing of the covering layer at areas corresponding neither to the bumps 815 nor to the bumps 825, by compression of the core member at areas corresponding to the bumps 825, and by compression of the bumps 815 as described above with reference to article 700.

Although the articles 500, 600, 700, and 800 have been described above without elastic layer portions disposed in the corresponding spacing regions, it is to be understood herein that any and/or all of these articles can further comprise elastic layer portions positioned in the corresponding spacing regions or an elastic layer disposed between the core member and the covering layer having holes corresponding to the bumps and the connection means, if any. Such an elastic layer or elastic layer portions can be same in structure and operation to any of the elastic layer/portions described above.

In all the above examples, couples of male and female portions can be uniformly distributed with respect to the internal surface of the covering layer and the outer surface of the core member, respectively. Alternatively, they can be arranged in a pre-determined order, e.g. with more such couples being disposed close to the periphery, or the centre of the article, or any other desired region. In addition, when one or both of the internal surface of the covering layer and the outer surface of the core member have bumps, the couples of the male and female portions can be disposed so as to have a plurality of such bumps between each two couples.

An article according to any aspect of the presently disclosed subject matter, can have the snap-fitting connection means described above and illustrated in FIGS. 9A-12 or any other snap-fitting connection means, i.e. having other configurations and proportions. For instance, the male and female portions can have a cross-sectional shape other than circular, e.g. they can be oval, polygonal, or the like. Moreover, quick mechanical connection similar to or other than snap-fitting described above can be used with lockable protrusions configured to be received and locked in corresponding locking grooves in any suitable manner.

In all the above examples male and female portions of the connection means are formed as unitary bodies with the covering layer and core member, respectively, which is possible because they are both rigid, i.e. configured to maintain its shape as produced. Consequently, articles having such connection means according to any aspect of the presently disclosed subject matter, do not require any additional means for connecting its covering layer to the core member directly or via the elastic layer. Alternatively, one or both of male and female portions of connection arrangement used in an article according to the presently disclosed subject matter, can be separately manufactured and then assembled together with one or both of the covering layer and core member In the hybrid structures of all the above examples, all components thereof can be made of materials allowing their recycling, including thermal processing, without separation between the components. For example, the materials of at least the core member and the covering layer with its connection elements can comprise the same basic thermoplastic substance or different basic thermoplastic substances that are meltable at the same recycling temperature, with said/each basic substance being, optionally, the only substance within said materials that melts at said temperature. Since these materials can constitute more than 90%, optionally, more than 93%, e.g. at least 95%, of the weight of the entire hybrid structure, the structure can be recycled without separation even if the remaining materials in the structure are not meltable at the above temperature.

The above-mentioned basic substance/s in the materials of the core member and the covering layer can be thermoplastic polymers of the same polymer family, e.g. such as polypropylene family, which at least in the core member and the covering layer can have different material form allowing them to have physical properties required for their intended function in the structure.

For example, the core layer which needs to be the thickest component in the structure can have a bulk density lower than of the covering layer which must be very thin for flexing under the flexing force as described in the above examples but still rigid to maintain its shape and the shape of its connection elements. Particularly, the core member can be made of an expanded particle foam, and the covering layer with its connection elements can be made of a more compact material suitable for injection-molding or the like. In this case, the core member can be formed by particle-foam molding into a desired shape and the covering layer can be made by injection molding or compression molding, thermoforming, extrusion, vacuum forming, or other technologies, allowing the covering layer and the connecting elements to maintain their shape as produced.

The elastic layer, if any, can have weight, which can constitute a minor fraction of the weight of the entire hybrid structure, e.g. 5% or less, so even if it is made of a material not meltable at the above recycling temperature, it can be recycled together with the other components of the hybrid structure without separation therefrom.

In one specific example, where the thermoplastic polymer substance is polypropylene, when it is used to produce the expanded-particle-foam core member or an elastic foam layer, if any, such core member and such elastic layer can each have a bulk density of 0.03-0.12 kg/litre; and when it used to produce the covering layer with its connection elements, such covering layer can have a density of 0.85-0.95 kg/litre, more particularly, 0.91 kg/litre.

The following are examples of the above materials all being polypropylene-based, which can be used in each of the hybrid structures described above:

| Name of component | Material Description | Material grade | Supplier |
| --- | --- | --- | --- |
| Injection-molded covering layer with its connecting elements | Glass - fiber reinforced polypropylene | TKG2039N & TKS 209N The combination of the two grades depends on the rigidity of the covering layer to be achieved | LyondellBasell |
| Elastic layer | Elastic polypropylene foam | IXPP foam | Any supplier |
| Molded core member | Expanded particle polypropylene foam | EPERAN-PP MN20 | Kaneka Corp. |

Whilst in all examples of the hybrid structure described above components thereof are connected to each other by means which are free of any adhesives, yet, if desired, an adhesive can be used between the covering layer and the core member or between one or both of these and the elastic layer, if any, for example if such adhesive is made of a material comprising the same basic substance, e.g. polypropylene, as those of the other components of the article.

The invention claimed is:

1. A hybrid structure having suspension quality, the hybrid structure comprising:
 a core member having an outer surface;
 a covering layer having an external surface and an internal surface, wherein the core member has a compressibility higher than that of the covering layer and a flexural modulus lower than that the covering layer;
 a plurality of bumps protruding from at least one of the outer surface of the core member and the internal surface of the covering layer at least along a portion thereof, the plurality of bumps having spacings therebetween; and
 a connection arrangement fixedly connecting the covering layer to the core member so as to create a plurality of gaps between the internal surface of the covering layer and the outer surface of the core member, the plurality of gaps being defined by said spacings, the covering layer being configured to flex inwardly into the plurality of gaps upon application of a force at the external surface of the covering layer at positions thereof corresponding to the plurality of gaps, and to flex back when the force is removed, thereby providing the structure with the suspension quality.

2. The hybrid structure according to claim 1, wherein said connection arrangement comprises a plurality of connecting elements associated with at least some of said areas of the covering layer and securely engaging the corresponding connection elements of the core member.

3. The hybrid structure according to claim 2, wherein said connecting elements are in the form of male portions constituted by lockable protrusions protruding from the covering layer towards the core member and lockingly received in corresponding female portions constituted by locking recesses in the core member.

4. The hybrid structure according to claim 3, wherein at least some of the lockable protrusions are formed at areas of the covering layer having the plurality of gaps thereunder and the corresponding locking recesses have the plurality of gaps thereabove, the arrangement being such as to allow each lockable protrusion having the gap thereunder to be free to move within the corresponding recess in the core member in the thickness direction thereof when the associated area of the covering layer flexes into the reduceable volume disposed thereunder.

5. The hybrid structure according to claim 1, wherein at least the core member and the covering layer are made of materials comprising the same basic substance in different material forms, the basic substance being meltable at a melting temperature and, optionally, being the only substance within each of said materials that melts at said melting temperature.

6. The hybrid structure according to claim 5, wherein a weight of said materials in the hybrid structure constitutes at least 90% of the total weight of the structure.

7. The hybrid structure according to claim 6, wherein the basic substance includes thermoplastic polymer.

8. The hybrid structure according to claim 7, wherein the material of the core member is in the form of an expanded particle foam.

9. The hybrid structure according to claim 1, wherein the covering layer is made of a compact continuous material and has a bulk density substantially higher than that of the core member.

10. The hybrid structure according to claim 9, wherein by covering layer is an injection molded body.

11. The hybrid structure according to claim 5, wherein said basic substance includes polypropylene.

12. The hybrid structure according to claim 1, wherein the connection arrangement includes a quick-connection arrangement.

13. The hybrid structure according to claim 12, wherein the quick-connection arrangement includes a snap-fitting arrangement.

14. The hybrid structure of claim 2, wherein the plurality of connecting elements are at least partially formed as a unitary body with the covering layer.

15. The hybrid structure of claim 1, further comprising an elastic foam layer disposed at least partially within said plurality of gaps.

16. A hybrid structure having a suspension quality, the hybrid structure comprising:
a core member having a first flexural modulus and a first compressibility and having an outer surface;
a reduceable-volume layer associated with the outer surface of the core member and having a reduceable volume at least at a number of regions thereof; and
a covering layer connected to the core member via the reduceable-volume layer and having an exterior surface and an interior surface, the covering layer having a second compressibility lower than the first compressibility and a second flexural modulus higher than the first flexural modulus, the covering layer being made of a material and having a thickness between interior and exterior surfaces that areas thereof overlying the reduceable volume are capable of flexing into the reduceable volume when a flexing force is applied to one or more areas, while maintaining the thickness of the covering layer at least at said one or more area, and flexing back when the flexing force is released, thereby providing the suspension quality to the hybrid structure.

17. The hybrid structure according to claim 16, wherein the number of regions of the reduceable-volume layer having a reduceable volume are constituted by one of the following:
air gaps spaced from each other;
said gaps and an elastic foam layer portions accommodated within said gaps; or
an elastic foam layer sandwiched between the outer surface of the core member and the covering layer, the elastic foam layer constituting a plurality of said regions free of any spacing therebetween.

18. The hybrid structure according to claim 16, wherein the covering layer is connected to the core member by a connection arrangement comprising a plurality of connecting elements associated with the covering layer and securely engaging the corresponding connection elements of the core member, and wherein optionally the connecting elements are at least partially formed as a unitary body with the covering layer.

19. The hybrid structure according to claim 18, wherein said plurality of connecting elements are in the form of lockable protrusions protruding from the covering layer towards the core member and lockingly received in corresponding locking recesses in the core member.

20. The hybrid structure according to claim 19, wherein at least some of the lockable protrusions are formed at the areas of the covering layer having the reduceable volume thereunder and the corresponding locking recesses have this volume thereabove, and wherein each connecting element associated with the area having the reduceable volume thereunder is free to move in an inward direction of the core member when the associated area of the covering layer flexes into the reduceable volume disposed thereunder.

21. The hybrid structure according to claim 16, wherein at least the core member and the covering layer are made of materials comprising the same basic substance in different material forms, the basic substance being meltable at a melting temperature and, optionally, being the only substance within each of said materials that melts at said melting temperature.

22. The hybrid structure according to claim 21, wherein the weight of said materials in the hybrid structure constitutes at least 90% of the total weight of the hybrid structure.

23. The hybrid structure according to claim 21, wherein the basic substance is thermoplastic polymer.

24. The hybrid structure according to claim 23, wherein the material of the core member is in the form of an expanded particle foam.

25. The hybrid structure according to claim 21, wherein the material of the covering layer is a compact continuous material having a density substantially higher than that of the core member.

26. The hybrid structure according to claim 25, wherein by covering layer is in the form of an injection molded body.

27. The hybrid structure according to claim 18, wherein the connection arrangement includes a quick-connection arrangement.

28. The hybrid structure according to claim 16, wherein the covering layer is connected to the core member by a connection arrangement including a plurality of connecting elements associated with the covering layer and securely engaging the corresponding connection elements of the core member, and that at least some of the connecting elements being located at the areas of the covering layer having the reduceable volume thereunder and the corresponding connection elements have this volume thereabove.

29. A hybrid structure having suspension quality, the hybrid structure comprising:
a core member and having an outer surface;
a reduceable-volume layer associated with the outer surface of the core member and having a reduceable volume at least at a number of regions thereof; and
a covering layer connected by a connection arrangement to the core member through the reduceable-volume layer and having an exterior and an interior surface, the covering layer being made of such material and having such thickness between said interior and exterior surfaces that areas thereof overlying the reduceable volume are capable of flexing into the reduceable volume, when a flexing force is applied to such area, while maintaining the thickness of the covering layer at least at said area, and flexing back when the flexing force is released, thereby providing the suspension quality to the hybrid structure,
wherein the connection arrangement comprises a plurality of connecting elements associated with the covering layer and securely engaging the corresponding connection elements of the core member, at least some of the connecting elements being located at the areas of the covering layer having the reduceable volume thereunder and the corresponding connection elements have this volume thereabove.

30. The hybrid structure according to claim 29, wherein each connecting element associated with the area having the reduceable volume thereunder is free to move within the core member in an inward direction of the core member when the associated area of the covering layer flexes into the reduceable volume disposed thereunder.

31. The hybrid structure according to claim 30, wherein said at least some connecting elements are in the form of protrusions protruding from the covering layer towards the core member and received in corresponding recesses in the core member.

32. The hybrid structure according to claim 31, wherein each protrusion associated with the area having the reduceable volume thereunder is free to move within the corresponding recess in core member in an inward direction of the core member when the associated area of the covering layer flexes into the reduceable volume disposed thereunder.

33. The hybrid structure according to claim 32, wherein said protrusions and the corresponding recesses have dimensions along a thickness direction of the covering layer such that a space is formed between the protrusion and a bottom surface of the corresponding recess in the thickness direction when the protrusion is received in the corresponding recess, allowing the protrusions to freely to move within the corresponding recesses in an inward direction of the core member when the associated area of the covering layer flexes into the reduceable volume disposed thereunder.

34. The hybrid structure according to claim 31, wherein one or more of the protrusions is a lockable protrusion protruding from the covering layer towards the core member and is lockingly received in corresponding locking recesses in the core member.

\* \* \* \* \*